(12) United States Patent
Takechi et al.

(10) Patent No.: US 10,713,006 B2
(45) Date of Patent: Jul. 14, 2020

(54) IMAGE DISPLAY APPARATUS, TOPIC SELECTION METHOD, TOPIC SELECTION PROGRAM, IMAGE DISPLAY METHOD, AND IMAGE DISPLAY PROGRAM

(71) Applicant: GATEBOX INC., Tokyo (JP)

(72) Inventors: Minori Takechi, Tokyo (JP); Naohiro Yasukawa, Tokyo (JP); Wataru Takehi, Tokyo (JP); Takumi Gima, Tokyo (JP)

(73) Assignee: Gatebox Inc., Tokyo (JP)

( * ) Notice: Subject to any disclaimer, the term of this patent is extended or adjusted under 35 U.S.C. 154(b) by 0 days.

(21) Appl. No.: 15/538,760

(22) PCT Filed: Sep. 23, 2016

(86) PCT No.: PCT/JP2016/078073
§ 371 (c)(1),
(2) Date: Jun. 22, 2017

(87) PCT Pub. No.: WO2018/016095
PCT Pub. Date: Jan. 25, 2018

(65) Prior Publication Data
US 2019/0138266 A1     May 9, 2019

(30) Foreign Application Priority Data

Jul. 19, 2016  (JP) .................................. 2016-141930
Jul. 19, 2016  (JP) .................................. 2016-141931

(51) Int. Cl.
*G06F 3/01*        (2006.01)
*G06F 3/16*        (2006.01)
(Continued)

(52) U.S. Cl.
CPC .......... *G06F 3/167* (2013.01); *G06F 16/5866* (2019.01); *G10L 15/265* (2013.01);
(Continued)

(58) Field of Classification Search
CPC ..... G01N 2035/00326; G01N 35/0092; G01N 35/00; G01N 35/1065; G06Q 30/02;
(Continued)

(56) References Cited

U.S. PATENT DOCUMENTS 7,427,140 B1 *  9/2008  Ma ........................ G06F 1/1616
                                                        353/30
9,583,103 B2 *  2/2017  Park .................... G06F 3/04886
(Continued)

FOREIGN PATENT DOCUMENTS

CN         1573924 A      2/2005
CN       102750125 A     10/2012
(Continued)

OTHER PUBLICATIONS

Leuski et al., How to talk to a hologram, 3 pages (Year: 2006).*
(Continued)

*Primary Examiner* — Thuy Dao
(74) *Attorney, Agent, or Firm* — DLA Piper LLP (US)

(57) ABSTRACT

An image display apparatus includes a display section configured to display a character, a conversation section by which the character executes a conversation with a user, and a chat section by which the character executes a chat with a communication terminal of the user, wherein the conversation section selects a next topic on the basis of content of an executed conversation and content of the chat executed by the chat section, and the chat section selects the next topic on the basis of content of an executed chat and content of the conversation executed by the conversation section.

12 Claims, 28 Drawing Sheets

(51) Int. Cl.
*G06T 19/00* (2011.01)
*G06F 3/0481* (2013.01)
*G10L 15/22* (2006.01)
*H04L 12/58* (2006.01)
*G06F 16/58* (2019.01)
*G10L 15/26* (2006.01)
*G02B 30/00* (2020.01)

(52) U.S. Cl.
CPC .............. *H04L 51/04* (2013.01); *H04L 51/10* (2013.01); *H04L 51/38* (2013.01); *G02B 30/00* (2020.01); *H04L 51/16* (2013.01)

(58) Field of Classification Search
CPC ...... G06Q 10/10; G06Q 50/01; G06Q 10/107; H04L 51/32; H04L 51/04; H04L 51/046; H04L 51/02; H04L 12/1818; H04L 67/02; H04L 67/306; H04L 67/38; G06F 3/167; G06F 3/017; G06F 3/013; G06F 3/016; G06F 9/453; G10L 15/265; G10L 15/10; G10L 15/38; G10L 15/16; G06T 19/006
See application file for complete search history.

(56) References Cited

U.S. PATENT DOCUMENTS

| | | | |
|---|---|---|---|
| 9,823,737 B2 * | 11/2017 | Mazed | G06F 3/011 |
| 10,354,256 B1 * | 7/2019 | McInerny | G06Q 30/016 |
| 2010/0121808 A1 | 5/2010 | Kuhn | |
| 2011/0055309 A1 * | 3/2011 | Gibor | G06Q 30/02 709/202 |
| 2013/0346886 A1 * | 12/2013 | Cauchois | H04L 51/046 715/758 |
| 2014/0067375 A1 * | 3/2014 | Wooters | G06F 17/28 704/9 |
| 2014/0279239 A1 * | 9/2014 | Gohar | G06Q 30/0617 705/26.43 |
| 2014/0307064 A1 | 10/2014 | Horimai et al. | |
| 2015/0207765 A1 * | 7/2015 | Brantingham | H04L 51/046 715/758 |
| 2015/0317837 A1 * | 11/2015 | Sholudko | G10L 15/265 345/633 |
| 2016/0266857 A1 * | 9/2016 | Jun | G06F 3/00 |
| 2017/0139375 A1 * | 5/2017 | Chung | G03H 1/0005 |
| 2017/0180276 A1 * | 6/2017 | Gershony | H04L 51/02 |

FOREIGN PATENT DOCUMENTS

| | | |
|---|---|---|
| CN | 204406271 U | 6/2015 |
| CN | 105141587 A | 12/2015 |
| CN | 105144286 A | 12/2015 |
| JP | 2000-181897 A | 6/2000 |
| JP | 2001-188787 A | 7/2001 |
| JP | 2002-169590 A | 6/2002 |
| JP | 2002-307354 A | 10/2002 |
| JP | 2002-351489 A | 12/2002 |
| JP | 2004-145541 A | 5/2004 |
| JP | 2007-88900 A | 4/2007 |
| JP | 2011-227237 A | 11/2011 |
| KR | 10-2010-0006361 A | 1/2010 |
| KR | 10-2013-0136630 A | 12/2013 |
| KR | 10-2014-0022332 A | 2/2014 |
| KR | 10-2014-0054493 A | 5/2014 |
| KR | 10-2014-0108494 A | 9/2014 |
| KR | 10-1532327 B1 | 6/2015 |
| KR | 10-2015-0137175 A | 12/2015 |
| TW | 200601808 A | 1/2006 |
| TW | I476449 B | 3/2015 |
| TW | M504275 U | 7/2015 |

OTHER PUBLICATIONS

Office Action dated Mar. 18, 2019, of counterpart Taiwan Application No. 106121155, along with an English translation.
English translation of Office Action dated Sep. 28, 2018, of counterpart Chinese Patent Application No. CN201680004506.7.
Notice of Final Rejection dated Jun. 13, 2019, of counterpart Korean Application No. 10-2017-7017320, along with an English translation.
"Hologram communication robot 'Gatebox' breaks dimensional walls! Mr. Winkle Mr. Takeshi & Mr. Yami interview", Jun. 3, 2016. <URL: http://www.famitsu.com/news/201606/03107156.html>.
English translation of Office Action dated Jun. 26, 2018, of counterpart Korean Patent Application No. 10-2017-7017320.
Korean Office Action dated Nov. 28, 2018, of counterpart Korean Application No. 10-2017-7017320, along with an English translation.
Notification of Reasons for Refusal dated Jul. 31, 2018, of counterpart Japanese Application No. 2016-141930, along with an English translation.
Second Office Action dated Feb. 28, 2019, of counterpart Chinese Application No. 201680004506.7, along with an English translation.
Okada [ realization / owner flower and / "my bride" device / recall / "Gatebox"] The IoT venture to which it challenged from tecnical zero. "I would like to carry out by being chosen and to send to a nerd", [online], ITmedia, Feb. 15, 2016, [Jul. 24, 2018 search], the Internet<URL:http://www. itmed ia.co.jp/news/articles/1602/15/news072. html> along with an English translation.
"It is realization about all the nerds' dream"—the hologram robot "Gatebox" which can live together with a favorite character—A venture of Japan to commercial production [online], ITmedia, Jan. 18, 2106, [Jul. 24, 2018 search], the Internet<URL:http://www. itmedia.co.jp/news/articles/1601/18/news101. html> along with an English translation.
Gatebox, ITmedia, http://www.itmedia.co.jp/news/article/1602/15/news072.html.
True Talk, Jetrun, http://www.jetrun.co.jp/curation/truetalk_ip.html.
Gatebox, Adjust, http://www.famutsu.com/news/201606/03107156.html.
The Third Office Action dated May 27, 2019, of counterpart Chinese Application No. 201680004506.7, along with an English translation.
English translation of Office Action dated Jul. 10, 2018, of counterpart Taiwan Patent Application No. TW106121155.
Offfice Action dated Oct. 7, 2019, of counterpart Taiwanese Application No. 106121155, along with an English translation.
Office Action dated Nov. 11, 2019, of counterpart Korean Application No. 10-2019-7024082, along with an English translation.
Office Action dated May 13, 2020, of counterpart Korean Application No. 10-2019-7024082, along with an English translation.

* cited by examiner

REAR ← → FRONT

FIG. 7A

| DISPLAY CONDITION | CHARACTER IMAGE | PERFORMANCE IMAGE |
|---|---|---|
| SOUND A | CHARACTER IMAGE A | PERFORMANCE IMAGE A |
| SOUND B | CHARACTER IMAGE B | PERFORMANCE IMAGE B |
| ... | ... | ... |
| ACTION C | CHARACTER IMAGE C | PERFORMANCE IMAGE C |
| ... | ... | ... |
| TIME D | CHARACTER IMAGE D | PERFORMANCE IMAGE D |
| ... | ... | ... |
| RECEIVED SIGNAL E | CHARACTER IMAGE E | PERFORMANCE IMAGE E |
| ... | ... | ... |

FIG. 7B

| OUTPUT CONDITION | SOUND |
|---|---|
| SOUND A | SOUND A |
| SOUND B | SOUND B |
| ... | ... |
| ACTION C | SOUND C |
| ... | ... |
| TIME D | SOUND D |
| ... | ... |
| RECEIVED SIGNAL E | SOUND E |
| ... | ... |

FIG. 7C

| OPERATION CONDITION | OPERATION SIGNAL |
|---|---|
| SOUND F | OPERATION SIGNAL F |
| ... | ... |

FIG. 8

| WORD | WEEKDAY MORNING | WEEKDAY NIGHT | HOLIDAY MORNING | HOLIDAY NIGHT |
|---|---|---|---|---|
| GOOD MORNING | GOOD MORNING. DO YOUR BEST TODAY, TOO! | WHAT ARE YOU TALKING ABOUT? LOOK AT WHAT TIME IT IS | GOOD MORNING. YOU CAN RELAX TODAY. | WHAT ARE YOU TALKING ABOUT? LOOK AT WHAT TIME IT IS |
| TIRED | WHAT ARE YOU TALKING ABOUT? PULL YOURSELF TOGETHER! | GOOD WORK TODAY TOO! | FATIGUE OF WEEKDAYS IS RELIEVED. | YOU'VE BEEN HAVING FUN ALL DAY.. TIME TO GET SERIOUS TOMORROW. |
| FREE | I WILL DO MY BEST TODAY, TOO ~ | IS THERE ANYTHING GOOD ON TV? | WHAT WILL YOU DO TODAY? | IS THERE ANYTHING GOOD ON TV? |
| WHAT ARE YOU DOING? | I WAS DOING ... | I WAS DOING ... | I WAS DOING ... | I WAS DOING ... |

| | 901 | 902 | 903 |
|---|---|---|---|
| | UTTERER | DATE | CONVERSATION CONTENT |
| | CHARACTER | 10/07/2016 18:30:10 | THERE IS A BASEBALL TV BROADCAST TODAY. |
| | USER | 10/07/2016 18:32:20 | IS THAT SO? THANK YOU FOR TELLING ME. |
| | CHARACTER | 10/07/2016 18:33:12 | WHICH TEAM DO YOU LIKE? |
| | USER | 10/07/2016 18:34:01 | I LIKE TEAM A. |
| | CHARACTER | 10/07/2016 18:23:02 | OH, IT'S A HOME RUN. |
| | ⋮ | ⋮ | ⋮ |

| | 1001 | 1002 | 1003 |
|---|---|---|---|
| | UTTERER | DATE | CHAT CONTENT |
| | CHARACTER | 02/07/2016 19:39:21 | WHAT ARE YOU DOING NOW? |
| | USER | 02/07/2016 19:40:30 | I'M WATCHING A BASEBALL GAME AT JINGU STADIUM. |
| | CHARACTER | 02/07/2016 19:41:31 | OH, IS THAT SO? |
| | USER | 02/07/2016 19:42:49 | WHICH PLAYER DO YOU LIKE? |
| | CHARACTER | 02/07/2016 19:39:21 | PLAYER a IS OKAY? |
| | ⋮ | ⋮ | ⋮ |

| KEYWORD 1101 | CONDITION 1102 | CONVERSATION OR CHAT CONTENT 1103 |
|---|---|---|
| BASEBALL, TV, BROADCAST | TV INFORMATION | THERE IS A BASEBALL TV BROADCAST TODAY. |
| BASEBALL, TV, BROADCAST | TV INFORMATION, WEATHER INFORMATION | THEY SAY THE NIGHT GAME WAS STOPPED BECAUSE OF RAIN TODAY. |
| BASEBALL, TV, BROADCAST | SOUND SIGNAL | OH, IT'S A HOME RUN. |
| COOKING, MEAT, STEAK | — | I HEARD THE FOOD AT SHOP xx IS TASTY.　I WOULD LIKE TO GO THERE. |
| COOKING, MEAT, STEAK | — | THE MEAT LOOKS DELICIOUS. |
| ... | ... | ... |

IMAGE DISPLAY APPARATUS, TOPIC SELECTION METHOD, TOPIC SELECTION PROGRAM, IMAGE DISPLAY METHOD, AND IMAGE DISPLAY PROGRAM

TECHNICAL FIELD

This disclosure relates to an image display apparatus that displays a character image, and relates to an image display apparatus that enables a user to feel more familiar with a character.

BACKGROUND

Various character products are conventionally sold and among such character products is what is known as a desktop character. This is an application that displays a character on a monitor of a PC or the like, operates according to a predetermined algorithm and displays specific speech or plays music. There is also an application that causes a character displayed on a communication terminal of a user to describe a provided service using a chat system (e.g., Japanese Unexamined Patent Application Publication No. 2004-145541).

Meanwhile, conventionally, there are a communication robot that performs communication in accordance with an external sound or the like, an electronic toy that operates in accordance with an external sound or the like (see, for example, Japanese Unexamined Patent Application Publication No. 2011-227237 and Japanese Unexamined Patent Application Publication No. 2002-307354).

On the other hand, responses by such robots and toys are limited. Specifically, robots and toys can make specific responses or movements with respect to a sound. However, the robots and toys make only simple responses and do not express emotion. Therefore, it may be difficult for a user to feel familiar with such robots or toys.

Meanwhile, for such character products, products allowing users to feel more familiar with characters are desired. It could therefore be helpful to provide an image display apparatus capable of implementing communication with a specific character and allowing a user to feel more familiar with the character.

SUMMARY

We thus provide an image display apparatus including a display section configured to display a character; a conversation section by which the character executes a conversation with a user; and a chat section by which the character executes a chat with a communication terminal of the user, wherein the conversation section selects the next topic on the basis of content of an executed conversation and content of the chat executed by the chat section, and wherein the chat section selects the next topic on the basis of content of an executed chat and content of the conversation executed by the conversation section.

The image display apparatus can allow a user to feel more familiar with a specific character by mutually linking topics between a real conversation performed by the user with the character and a chat to be performed by the user with an image display apparatus using his/her own communication terminal in communication with the character.

BRIEF DESCRIPTION OF THE DRAWINGS

FIG. 7A is a data configuration diagram of image data used in the image display apparatus according to the example.

FIG. 7B is a data configuration diagram of sound data used in the image display apparatus according to the example.

FIG. 7C is a data configuration diagram of signal data used in the image display apparatus according to the example.

FIG. 8 is a diagram illustrating a pattern of a sound output by the image display apparatus according to the example.

FIG. 9 is a data configuration diagram illustrating a data configuration example of conversation history data used in the image display apparatus according to the example.

FIG. 10 is a data configuration diagram illustrating a data configuration example of chat history data used in the image display apparatus according to the example.

FIG. 11 is a data configuration diagram illustrating a data configuration example of random conversation data used in the image display apparatus according to the example.

DETAILED DESCRIPTION

Hereinafter, an image display apparatus according to an example will be described with reference to the drawings. The image display apparatus according to the example displays a character image and outputs the character's sound. At this time, the character image displayed on the image display apparatus and the character's sound are determined according to an environment in which the image display apparatus is placed, information about the user possessing the apparatus, and time information.

Configuration of Apparatus

Figure 1:
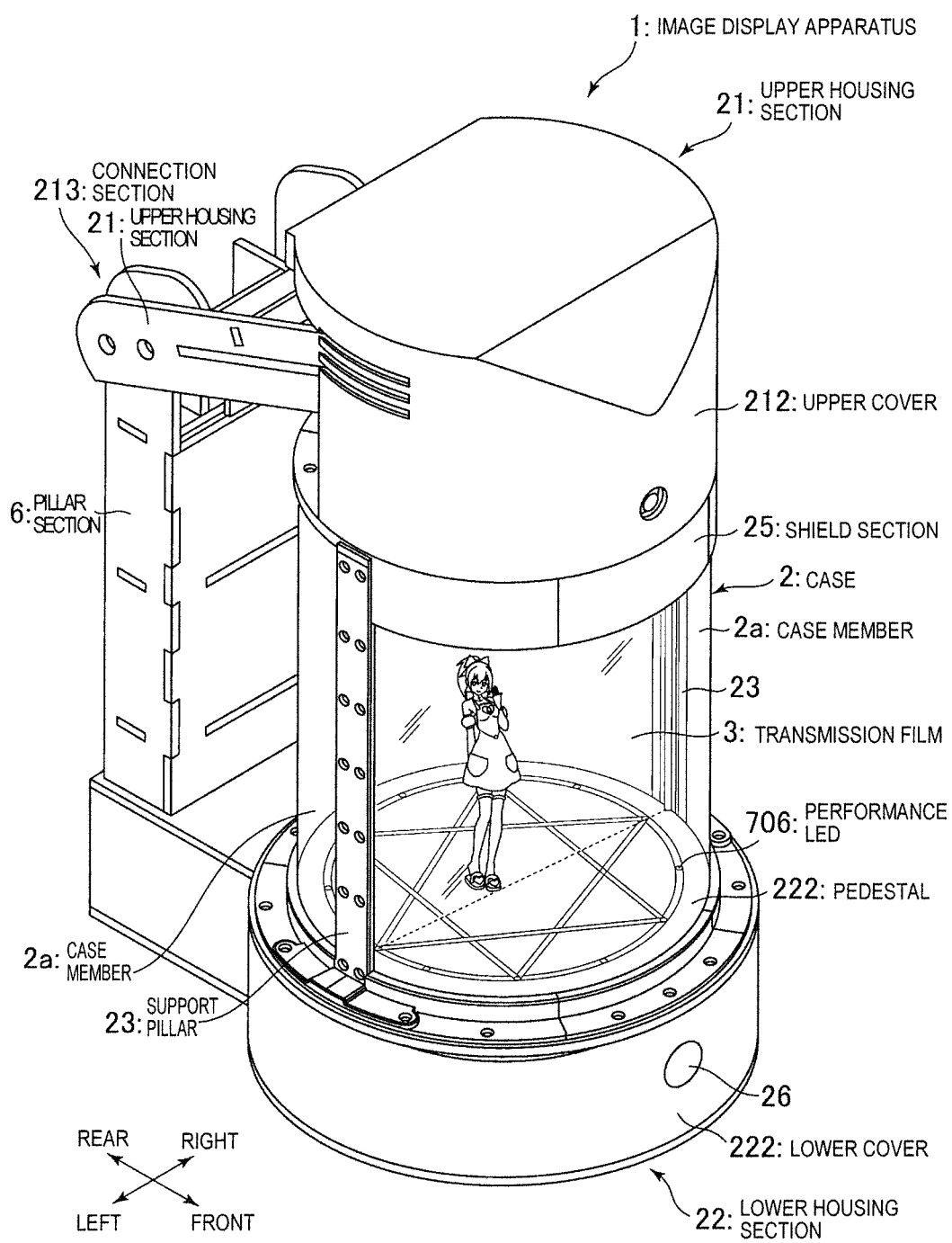
FIG. 1 is a perspective view of an image display apparatus according to an example viewed from above.
Figure 2:
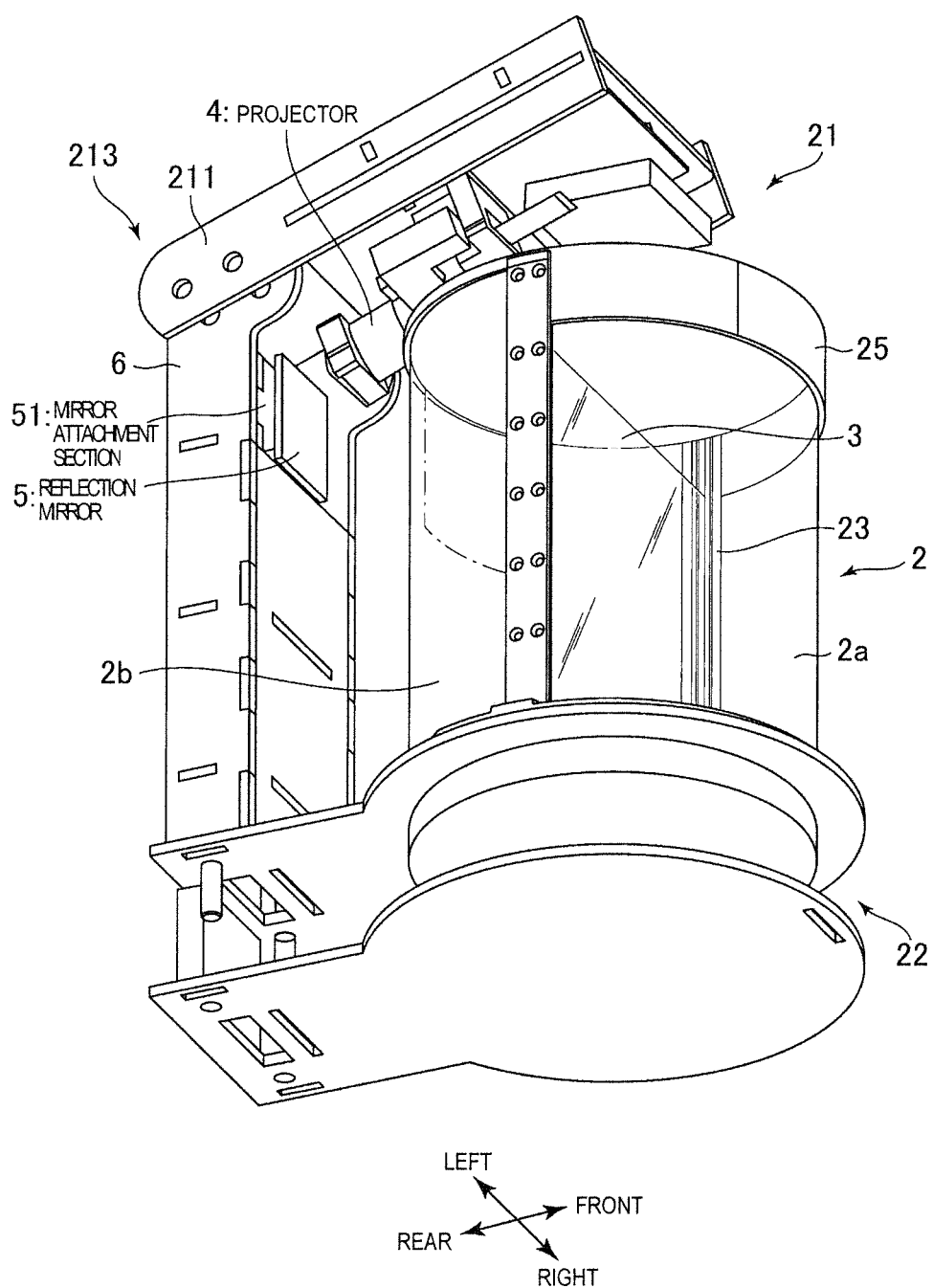
FIG. 2 is a perspective view of the image display apparatus according to the example viewed from below.

First, the configuration of an image display apparatus 1 according to the example will be described using FIGS. 1 to 4. FIG. 1 is a perspective view of the image display apparatus 1 viewed from above. FIG. 2 is a perspective view of the image display apparatus 1 viewed from below.

As illustrated in FIGS. 1 and 2, the image display apparatus 1 mainly includes parts or devices such as a cylindrical transparent case 2 having a hollow interior, a transmission film 3 (a flat member) substantially vertically erected inside the case 2, a projector 4 that outputs a character image and the like, a reflection mirror 5 and the like.

In the image display apparatus 1 having such a configuration, an image output from the projector 4 is projected onto the transmission film 3 through reflection by the reflection mirror 5 and the user can view the image projected onto the transmission film 3 through the transparent case 2.

The case 2 is a case made of a light transmitting member in part or in whole, and is made of, for example, an acrylic plate or the like. For example, the case 2 forms an integral transparent cylinder as a whole with two transparent semi-cylindrical case members 2a and 2b embedded in two support pillars 23. However, a pre-formed cylindrical body can also be used for the case 2 and a cylindrical body formed by bending a rectangular plate material or film material having elasticity or flexibility in a semi-circular pillar shape and embedding the material in the support pillar 23 can also be used as the case 2. By using the cylindrical case 2 in this manner, it is possible for the image projected onto the transmission film 3 to be properly viewed from any angle on the left/right. In addition, the support pillar 23 may be formed of a transparent member. In this case, substantially the entire case 2 can be made transparent. However, the support pillar 23 may be opaque or translucent.

An opaque shield section 25 in the form of a belt curved along the surface of the case 2 is provided in an upper part of the front side of the case 2. Thereby, when the case 2 is viewed from the front side, because the reflection mirror 5 is behind the shield section 25, the reflection mirror 5 can be concealed from view. Although not illustrated, a circular section corresponding to an upper base of the case 2 is subjected to light-shielding treatment such as coating of a light-shielding coating material. Thereby, it is possible to prevent indoor illumination or the like from entering the transmission film 3 and it is easy to view the image displayed on the transmission film 3. In addition, an opening is provided in an upper part on the rear side of the case 2 (an upper part of the case member 2b) so that light which forms the image from the reflection mirror 5 can directly reach the transmission film 3 without passing through the case member 2b. In addition, the case 2 is not limited to a transparent member and a milky white translucent member may be used.

Inside the case 2, the transmission film 3 is provided and an upper housing section 21, a lower housing section 22, and a pillar section 6 to be described below are provided on upper, lower, and rear sides of the case 2.

The transmission film 3 is an example of a "light-transmitting flat member" and functions as a transparent screen onto which a predetermined image is projected. The transmission film 3 of the example has a rectangular shape and is erected to be substantially perpendicular in the vicinity of the center of the inside of the case 2. Specifically, the transmission film 3 is supported by two support pillars 23 erected on both ends of the pedestal 221, whereby the transmission film 3 has a front surface facing the front side (rear side) and is erected vertically at the center of the pedestal 221. Instead of the transmission film 3, a transparent plate material, a translucent plate material or film material or the like can be used.

Figure 4A:
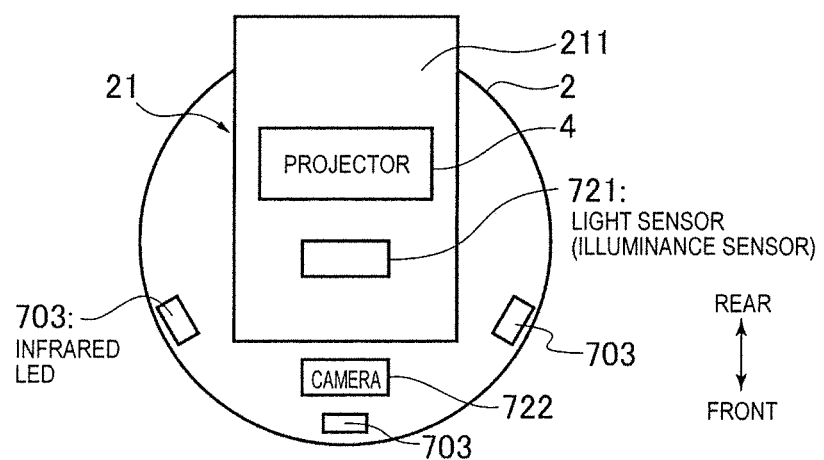
FIG. 4A is a diagram schematically illustrating a device installed in an upper housing section as a device installed in the image display apparatus according to the example.
Figure 4B:
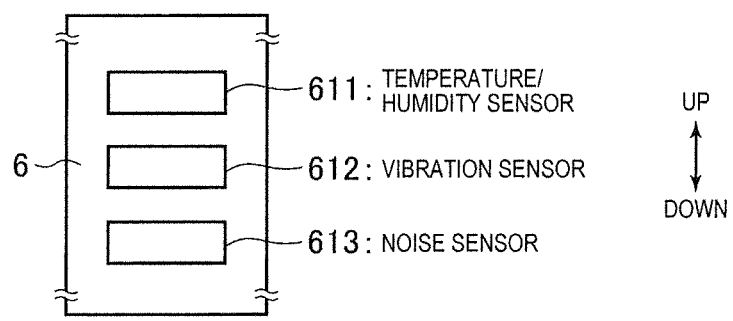
FIG. 4B is a diagram schematically illustrating a device installed in a pillar section as a device installed in the image display apparatus according to the example.
Figure 4C:
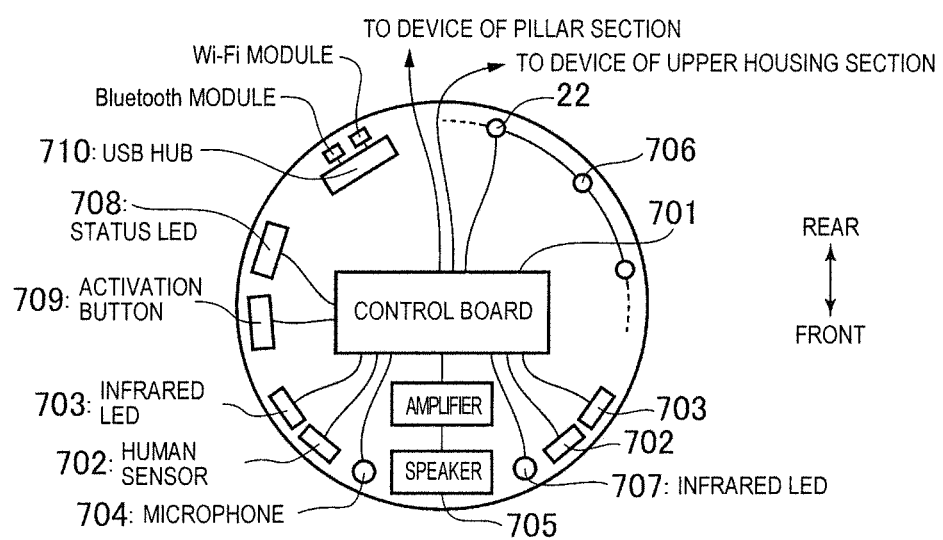
FIG. 4C is a diagram schematically illustrating a device installed in a lower housing section as a device installed in the image display apparatus according to the example.

The lower housing section 22 is a box made of plastic or the like and has a space to attach a control board 701 to perform various control operations including output control of the projector 4 and other devices (see FIG. 4C). A removable lower cover 222 is provided in the lower housing section 22 and the inside thereof can be concealed by attaching the removable lower cover 222, and maintenance of an internal device and the like can be performed by detaching the removable lower cover 222. On the pedestal 221 of the upper surface of the lower housing section 22, support pillars 23 are erected on left and right ends of an erection position of the transmission film 3.

The transmission film 3 and the case members 2a and 2b are supported by the support pillars 23 and integrally erected on the pedestal 221. Thereby, the cylindrical case 2 is erected on the pedestal 221, a side portion of the transmission film 3 is inscribed inside the case 2, and a lower portion (lower end) of the transmission film 3 is provided along an upper surface (front surface) of the pedestal 221.

The pedestal 221 also functions as a table for virtually placing a character or the like to be displayed inside the case 2. That is, the pedestal 221 can be made to look like a base substrate of a display case that houses a doll or a model in a displayable manner.

In the image display apparatus 1, by adjusting an angle or direction of the reflection mirror 5 by the mirror attachment section 51, the feet of the character or the like are displayed to coincide with a lower end of the transmission film 3 (FIG. 1). Thereby, it is possible to view the character or the like as if the character or the like were actually standing on the pedestal 221.

In addition, the pedestal 221 has predetermined visibility. Specifically, by patterning or coloring the surface of the pedestal 221 or by giving features to the shape thereof, the presence of the pedestal 221 is made conspicuous. For example, in the pedestal 221 of the example, grooves are formed on the surface of the acrylic plate by laser processing or the like along a pattern of a so-called magic square. This pattern is merely an example. For example, as the magic square, a pentagram may be applied or other complicated geometric patterns may be applied.

Further, in the pedestal 221, a plurality of performance LEDs 706 (light-emitting means) are separately arranged in the lower part of the acrylic plate so that the light from the performance LED 706 can reach the entire surface of the pedestal 221. In this manner, because each region spanning the transmission film 3 is strongly recognized on the front surface of the pedestal 221, the existence of the pedestal 221 on the front and back of the character or the like projected onto the transmission film 3 can be emphasized more. Then, a character or the like can be viewed as if it were standing on the pedestal 221 with a firm stance.

The upper housing section 21 has a space for attaching a device (see FIG. 4A) such as the projector 4 for outputting an image. Specifically, a ladder-shaped upper device attachment section 211 connected to the upper part of the pillar section 6 is provided in the upper housing section 21 and the projector 4 is attached to a lower surface of the upper device attachment section 211.

Figure 3:
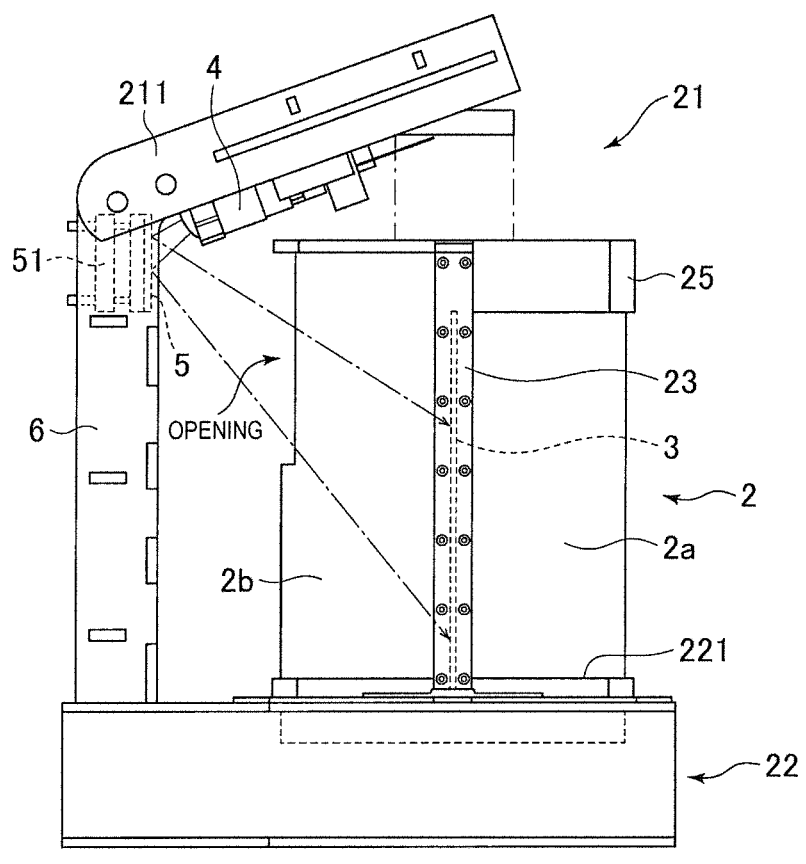
FIG. 3 is a left side view of the image display apparatus according to the example.

As illustrated in FIGS. 2 and 3, the upper device attachment section 211 is fixed in an inclined state from the connection section 213 for the pillar section 6 to an upper portion of the front side and, accordingly, the projector 4 attached to the upper device attachment section 211 is also fixed in an obliquely inclined state. In this manner, by attaching the projector 4 obliquely, an output direction of the image is directed to the reflection mirror 5 located below a rear side of the projector 4.

The upper device attachment section 211 can be pivotally supported by a shaft member such as a bolt in connection with the pillar section 6, rotated to any position around the shaft, and fixed with a fixing member such as a nut. In this manner, the inclination of the projector 4 can be easily changed, and the output of the image can be adjusted in a vertical direction according to this change.

A removable upper cover 212 is provided in the upper housing section 21 so that devices such as the upper device attachment section 211 and the projector 4 can be concealed by attaching the removable upper cover 212 and maintenance and the like of the internal devices can be performed by detaching the removable upper cover 212.

The projector 4 is an image output means for outputting an image such as a character image. This type of projector 4 normally displays an image by directly projecting an image onto a so-called screen, but an image is indirectly projected onto the screen (the transmission film 3) via the reflection mirror 5 in the example. Specifically, the projector 4 of the example is attached in the inclined state in the upper housing section 21 so that the output image is directed to the reflection mirror 5 on the upper section of the pillar section 6 separately erected on the rear side of the case 2.

Meanwhile, the specifications of the projector include a focal length (hereinafter referred to as an "allowable projection distance") and a projection ratio (hereinafter referred to as an "allowable projection angle"). The "allowable projection distance" is a necessary projection distance (a distance of an optical path from the projector to the screen) corresponding to an image size. If the actual projection distance is less than the allowable projection distance, the focus cannot be aligned and the image cannot be clearly projected. The "allowable projection angle" is an allowable value of the angle between the optical path of the image projected onto the screen and the screen. If the actual projection angle is less than the allowable projection angle, the distortion of the image becomes large and deterioration of the image quality such as image blur is caused by a difference between amounts of light at both ends of the image.

In view of these points, a projector having the specification of a relatively short allowable projection distance and small allowable projection angle are used as the projector 4 of the example and the projector 4 and the screen (i.e., the transmission film 3) can be compactly integrated by further using the reflection mirror 5.

The pillar section 6 is a pillar member erected on a backmost part of the lower housing section 22 and erected on the back side of the case 2 by separating the pillar section 6 from the case 2. By providing the pillar section 6 on the rear side of the case 2 as described above, indoor illumination or the like can be prevented from entering the transmission film 3 and the image displayed on the transmission film 3 can be easily viewed. The reflection mirror 5 and various sensors are attached to the pillar section 6 (see FIGS. 2, 3, 4B and the like).

The reflection mirror 5 is provided so that a mirror surface is substantially vertical at the upper part of the pillar section 6 (i.e., substantially parallel to the surface of the transmission film 3). Thereby, light of the image having a predetermined angle of incidence output from the projector 4 in a diagonally downward direction on the rear side is reflected at the same angle (reflection angle) and the image is projected onto the transmission film 3 by the reflected light. In this manner, because it is possible to suppress a distance difference between projection distances of upper and lower parts of the image on the transmission film 3, it is possible to suppress blurring and the like of the image projected onto the transmission film 3.

As illustrated in FIG. 3, the light of the image output from the projector 4 is reflected by the reflection mirror 5, the reflected light of the image moves obliquely downward on the front side, passes through the opening of the case member 2b, and is projected onto the transmission film 3 provided inside the case 2 from the rear side. In this state, when the image of the character or the like projected onto the transmission film 3 is viewed through the case 2, it is possible to visually confirm the character or the like like a more stereoscopic substance in the same space.

The reason why such a visual confirmation effect is exerted will be described below. As described above, in the image display apparatus 1, a transparent film (transmission film 3) is provided inside the transparent case 2 and an image is projected onto this transparent film. In such the image display apparatus 1, the user views a character or the like displayed on the transparent film through the transparent case 2.

In this case, since a space is partitioned by the case 2, the user recognizes the 3D environment, that is, length (height), width, and depth, in the limited space of the case 2. Thus, in particular, by recognizing the depth generated from the relationship between the case 2 and the character or the like displayed within the space, a visual effect (3D environmental effect) is exerted as if the character or the like itself were being viewed in 3D (stereoscopically).

That is, when the transparent case 2 is viewed behind the character or the like, the character or the like and the partition on the rear side thereof are seen together in the closed space. As a result, the character or the like is viewed stereoscopically on the basis of a sense of depth of the character or the like and the transparent case 2 in the same space.

On the other hand, if the case 2 is eliminated and an image of the character or the like projected onto the transparent film is viewed in an open space in which there is nothing around it, the recognition of the length/width of the surrounding space is strong but the recognition of the depth is weak. Then, even if the image of the character or the like projected onto the transparent film is viewed in such an open environment, the presence of the film is only increased and it is difficult for the sense of depth to be felt, so it is difficult to exert the stereoscopic visual effect as described above.

In addition, when a transparent film is viewed through the transparent case 2, the transparent film becomes inconspicuous. This is because the transmission film 3 is inscribed in the case 2 and therefore the left and right ends of the transmission film 3 become invisible. In addition, when a rear substance is viewed through a front substance including a transparent substance, it is difficult to recognize the rear substance.

When this is applied to the image display apparatus 1, for example, when the case 2 is viewed from the front side, it is difficult to recognize the transmission film 3 behind the case 2 (the case member 2a). Then, because the presence of the planar transmission film 3 is not recognized, the character or the like projected onto the transmission film 3 is viewed as a floating three-dimensional object which is not planar. By this reason, the image of the character or the like can also be viewed more stereoscopically when the case 2 is included than when the case 2 is not included.

In the image display apparatus 1 of the example, the pedestal 221 is provided at the lower part (lower end) of the transmission film 3, and the feet of the character or the like are displayed to coincide with the lower end of the transmission film 3. In this manner, the character or the like is viewed as if it were standing on the pedestal 221 and it is possible to make an illusion as if the character or the like were a three-dimensional object having mass.

In particular, a pattern or the like is provided on the pedestal 221 so that the surface thereof is easy viewed and the performance LED 706 is disposed in both the front side region and the rear side region spanning the transmission film 3 to emit light. Thereby, it is possible to clearly recognize that the pedestal 221 is located at the front/rear of the character or the like and therefore the character or the like can be viewed as if it were standing on the pedestal 221 with a firm stance. Therefore, according to such a relationship with the pedestal 221, the character or the like projected onto the transmission film 3 can be viewed like a substantial three-dimensional object in the transparent case 2.

In addition, the reflected light from the reflection mirror 5 provided in the upper part on the rear side is projected onto the transmission film 3 and a part of the light of the image is transmitted through the transmission film 3 and projected as a shadow of light onto the pedestal 221. Even when such a shadow is seen, the effect of stereoscopically viewing the display object is exerted.

Next, devices mounted on the image display apparatus 1 will be described with reference to FIGS. 4A to 4C. FIG. 4A is a schematic diagram of a device installed in the upper housing section, FIG. 4B is a schematic diagram of a device installed in the pillar section, and FIG. 4C is a schematic diagram of the device installed in the lower housing section.

In addition, by making the side of the case 2 opaque, decorating an opaque film on the side part or the like, the visibility of the character from the side surface is reduced to make the user view the character from the front side. The image from the projector is projected onto the transmission film 3, but, for example, a configuration capable of spraying water droplets or the like is provided in the image display apparatus and the character may be projected with such stereoscopic holography in which projection is performed on the sprayed water droplets. By applying stereoscopic holographic technology, it is possible to display a more stereoscopic character.

Devices Installed in Lower Housing Section

As illustrated in FIG. 4C, a Wi-Fi (registered trademark) module, a Bluetooth (registered trademark) module, and the like as well as a control board 701, a human sensor 702, an infrared LED 703, a microphone 704, a speaker 705, a performance LED 706, an infrared light reception section 707, a status LED 708, an activation button 709, and a USB hub 710 are installed in the lower housing section 22.

The control board 701 is equipped with one or more control chips equipped with a CPU, a ROM, a RAM, an HDMI (registered trademark) port, a LAN port, a USB port, various input/output ports, and the like, and causes the predetermined device to execute various output operations including an image and sound on the basis of information input from various sensors and the like.

The human sensor 702 is a sensor for detecting the location of a person by detecting an amount of infrared change and is provided on the left and right of the front side.

The infrared LED 703 is radially provided on a front upper portion and functions as a so-called infrared remote controller. Specifically, by outputting infrared light to the surroundings, it is possible to remotely operate an external device such as a television or a vacuum cleaner.

Sound uttered by the user is input to the microphone 704. For example, one microphone 704 is provided in a lower stage of the front.

The speaker 705 outputs sound information such as sound and music via an amplifier. In the example illustrated in FIG. 4C, the speaker 705 is provided on a front side, but it is preferable that the speaker 705 be installed in the stereo manner on the left and right of the rear pillar section.

The performance LED 706 is a light emitting means in the pedestal 221.

The infrared light reception section 707 is provided on the front side and receives infrared information about a remote control operation used in a remote controller from the remote controller of a home appliance such as a television, a lighting instrument, an air conditioner, a robot cleaner or the like.

The status LED 708 is a notification means indicating the state of the image display apparatus 1 (for example, power on, error occurrence, communicating, or "sleep state," "non-summoned state," "summoned state" or the like to be described below) and provides a notification of various states so that the various states can be distinguished by a specific blinking pattern, a light emission color or the like.

The activation button 709 is an operation means that turns the power supply of the main body of the image display apparatus 1 on and off.

The USB hub 710 is a hub for connecting a plurality of USB devices.

The Wi-Fi (registered trademark) module is a wireless LAN module connected to a USB hub, and can provide an Internet environment to a wireless LAN slave as an access point and can be connected to the Internet via another access point as a wireless LAN slave.

The Bluetooth (registered trademark) module is a wireless communication interface which enables wireless communication with a keyboard or a mouse corresponding to a predetermined standard, a communication terminal such as a smartphone, or a peripheral device such as a microphone or a speaker.

Devices Installed in Pillar Section

As illustrated in FIG. 4B, in addition to the above-described reflection mirror 5, a temperature/humidity sensor 611, a vibration sensor 612, and a noise sensor 613 are provided in the pillar section 6.

The temperature/humidity sensor 611 measures the temperature and humidity in the room and inputs these measured values.

The vibration sensor 612 is a sensor that detects vibration, and corresponds to, for example, a piezoelectric vibration sensor. The vibration detected by the vibration sensor 612 includes are relatively small vibrations capable of identifying footsteps and opening and closing of doors in addition to large tremors such as earthquakes.

The noise sensor 613 is a sensor that detects environmental sounds inside the room. Environmental sounds detected by the noise sensor 613 include, for example, sounds from the user's daily life (including the sound of a television), environmental sounds in the neighborhood, and noises that are determined on the basis of a predetermined reference sound volume.

Devices Installed in Upper Housing Section

As illustrated in FIG. 4C, a projector 4, an infrared LED 703, a light sensor (illuminance sensor) 721, and a camera 722 are provided in the upper housing section 21.

As described above, the projector 4 projects images onto the transmission film 3 via the reflection mirror 5. The images output from the projector 4 include, for example, 2D images and 3D images of characters appearing in various comics and animations, real persons, articles and the like, and performance images for representing emotional expressions of the character.

The infrared LED 703 is provided on each of the left and right, and functions as an infrared remote controller similar to that provided in the upper housing section 21.

The light sensor (illuminance sensor) 721 is a sensor that measures brightness (illuminance).

The camera 722 is provided at the front side and is an imaging means that captures a still image or a moving image.

Functions

Figure 5:
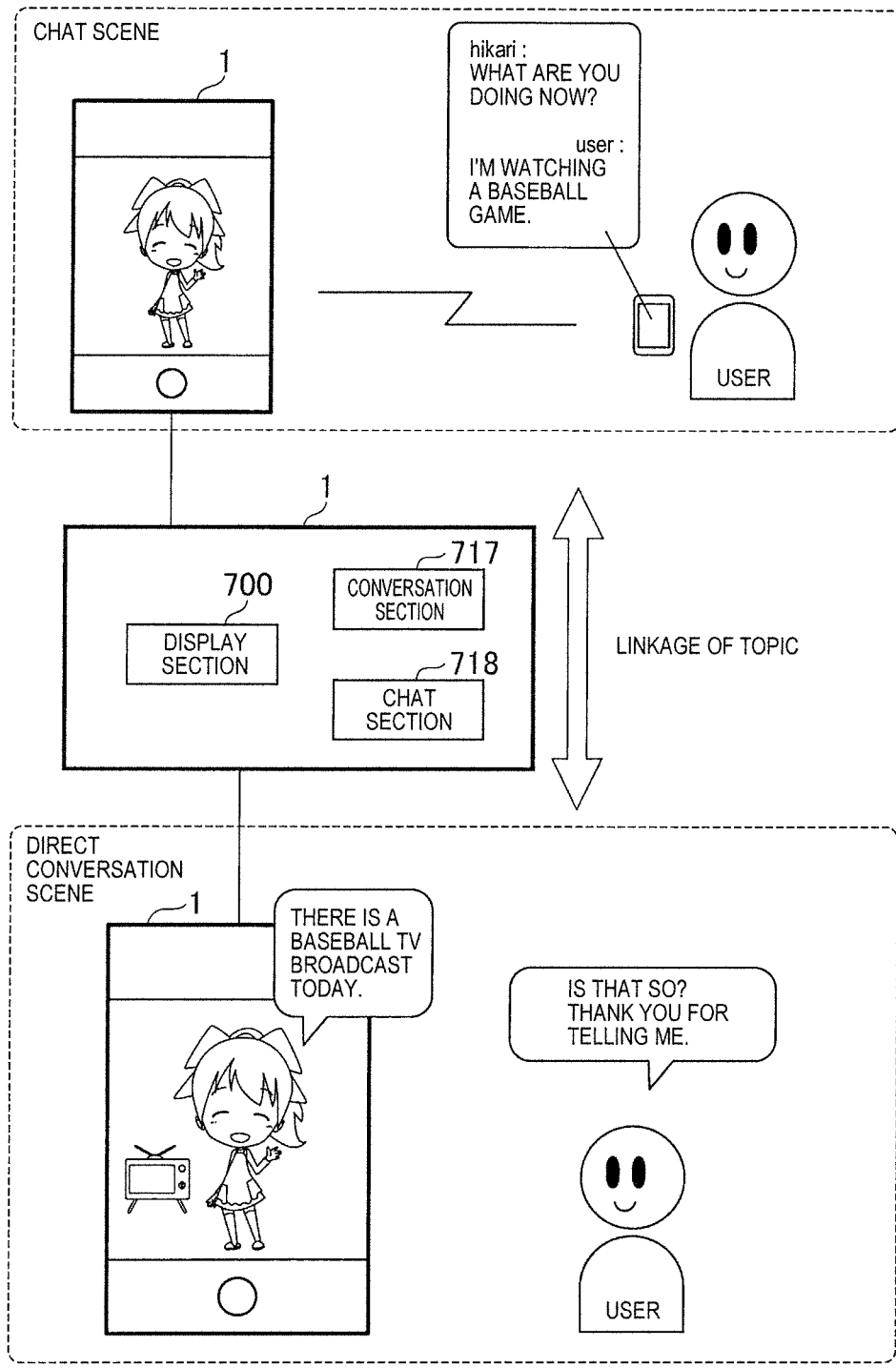
FIG. 5 is a functional block diagram of the image display apparatus according to the example and is a diagram illustrating one use mode.

Next, functions realized by the above-described devices will be described with reference to FIGS. 5 and 6. FIG. 5 is a functional block diagram of the image display apparatus 1 according to the example. As illustrated in FIG. 5, the image display apparatus 1 includes a display section 700, a conversation section 717, and a chat section 718.

The display section 700 has a function of displaying a character. For example, the character is displayed by causing the projector 4 to project an image of the character onto the transmission film 3. The display section 700 is realized by, for example, a processor, a graphic engine or the like, but the realization method is not limited thereto. The character is a person, an animal or the like appearing in an animation, a comic, a novel, a computer game or the like, but the character is not limited thereto and may be an originally created person. In addition, an inorganic substance having individuality as well as persons and animals can also serve as the character. Examples thereof include a robot or the like.

The conversation section 717 has a function of performing a conversation with the user, and has a function of directing the character to perform the conversation with the user. The conversation section 717 is realized by, for example, a processor and performs the conversation with the user in accordance with a predetermined algorithm. The conversation section 717 selects a topic of a conversation with the user from sound stored in advance to output the sound from the speaker 705 and executes the conversation by analyzing the sound of the user input from the microphone 704. Although the character's sound is stored in advance, this is not limited and the character may output synthesized sound as the sound.

The chat section 718 executes a chat with the communication terminal held by the user, is realized by, for example, a processor, and performs a chat with the user in accordance with a predetermined algorithm. The chat section 718 may perform a chat by executing direct wireless communication with the user's communication terminal or may execute a chat via a predetermined messaging server (chat server). The chat is for exchanging so-called messages (communication messages). The chat section 718 automatically selects content of the conversation, transmits the selected content of the conversation as a string, analyzes the content of the chat transmitted from the communication terminal of the user, selects a topic in accordance with the analyzed content to generate a response, and transmits a message thereof.

The conversation section 717 and the chat section 718 are linked to each other. The fact that the conversation section 717 and the chat section 718 are linked to each other means that a conversation between the character and the user executed by the conversation section 717 is reflected in the content of the chat executed by the chat section 718 and content of the chat executed with the communication terminal of the user by the chat section 718 is reflected in the content of the conversation executed by the conversation section 717. The content of the chat and the content of the conversation are content of utterances themselves or topics. In this case, the fact that the conversation section 717 and the chat section 718 are linked means, for example, that when the conversation section executes a baseball-related conversation with the user, a baseball-related topic is included in a topic executed by the chat section, and more precisely, that there is a possibility that a baseball-related topic will be executed. The conversation section 717 and the chat section 718 are realized by the control section 71 to be described below.

In addition, as described above with reference to FIGS. 1 to 3, the image display apparatus 1 can further include the case 2 at least a part of which is made of a light transmitting member. The display section 700 can include the transmission film 3 which is a light-transmitting flat plate member erected inside the case 2, a projector 4 which is a light projecting device that projects a character image and a performance image onto the transmission film 3 which is a flat plate member, and a display processing section 713 that controls the display of an image via the projector which is the light projecting device.

Figure 6:
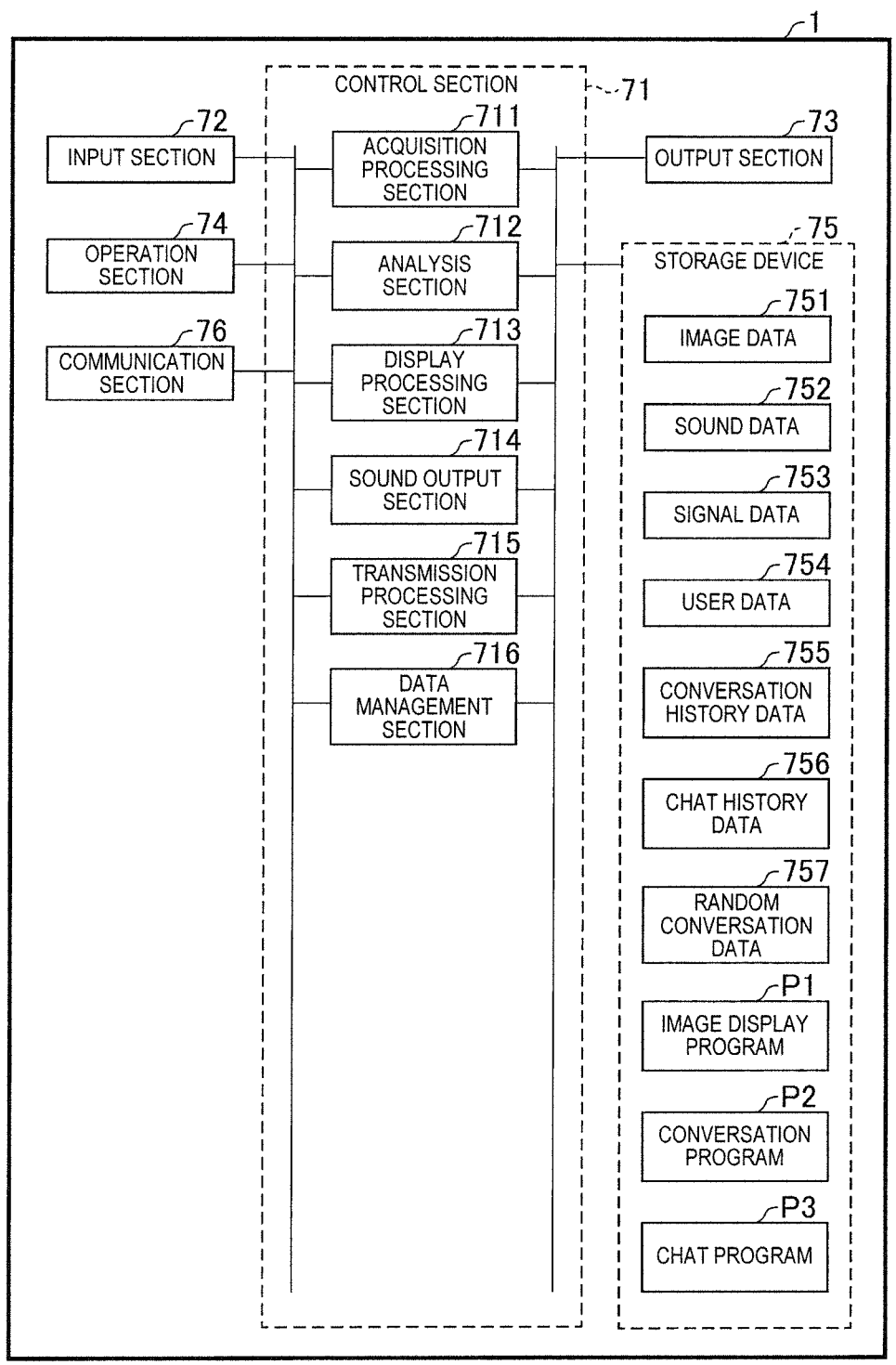
FIG. 6 is another functional block diagram of the image display apparatus according to the example.

Specifically, as illustrated in FIG. 6, the image display apparatus 1 includes a control section 71, an input section 72, an output section 73, an operation section 74, a storage device 75, and a communication section 76. By executing an image display program P1, a conversation program P2, and a chat program P3 stored in the storage device 75, the control section 71 can execute processes corresponding to the acquisition processing section 711, the analysis section 712, the display processing section 713, the sound output section 714, the transmission processing section 715, and the data management section 716.

The input section 72 is a means to input various types of information detected by various types of sensors. Data input to the input section 72 includes, for example, identification information output from the human sensor 702 when the human sensor 702 detects a person, sound information input via the microphone 704, information about temperature or humidity inside a room detected by the temperature/humidity sensor 611, information to identify a magnitude and change of vibration detected by the vibration sensor 612, sound volume information input via the noise sensor 613, illuminance information input via the light sensor 721, information about a still image/moving image captured by the camera 722 and the like.

The output section 73 is an output means to output a signal or information on the basis of a predetermined command. The signal or information output by the output section 73 includes, for example, an infrared signal for controlling an operation of an external device output from the infrared LED 703, sound information output via the speaker 705, light emitted from the performance LED 706, an image output from the projector 4, and the like.

The operation section 74 is an operation means of the user, and corresponds to, for example, a keyboard or a mouse (not illustrated), operation buttons (hard keys) provided in the image display apparatus 1, and a touch panel. For the operation performed by the operation section 74, there are a button for turning the power supply of the apparatus main body on and off with the activation button 709, a button to switch the image display apparatus 1 between the sleep state (non-summoned state) and the active state (summoned state), and the like.

The storage device 75 includes, for example, a RAM, a nonvolatile memory such as an EEPROM or a flash memory, or the like constituting the image display apparatus 1, and is a storage means that stores programs and data to execute various functions of the image display apparatus 1. The data stored in the storage device 75 includes image data 751 and sound data 752 of a character or the like, signal data 753 to operate external devices such as a television and a lighting instrument, user data 754 related to attribute information of the user, conversation history data 755 of a history in which the image display apparatus 1 has executed a conversation with the user, chat history data 756 of a history in which the image display apparatus 1 has executed a chat with the communication terminal of the user, remote control information related to remote control of the external device, calendar information registered in a calendar site, attribute information of the apparatus main body or each device, information input from the sensors, music information, language data and the like. In addition, in the storage device 75, programs to be stored include the conversation program P2 to have a direct conversation with the user, the chat program P3 to execute a chat with the communication terminal of the user (via the chat server), a sound recognition program, an artificial intelligence program and the like in addition to the image display program P1 to execute various control operations to be described below.

The image data 751 includes data in which a display condition to display an image is associated with character image information (first image information) to specify a character image to be displayed due to the condition, and performance image information (second image information) to specify the performance image. The performance image expresses the emotion of the character and the like and may be an image including text of a term expressing the emotion or the like, or may be an image including particles of a star shape, a heart shape or the like. The performance image is not indispensable and may not be displayed. For example, the performance image may be displayed with a predetermined probability. Specifically, for example, a random threshold value that varies daily is provided and a random value is calculated at each time as to whether or not to display the performance image at the timing of display of the performance image so that the performance image may be displayed according to whether or not the random value exceeds the set threshold value. It is preferable that the character image information be image information of a three-dimensional image. In addition, the performance image information is image information of a two-dimensional image or image information of a three-dimensional image in accordance with a situation.

In the example of the image data 751 illustrated in FIG. 7A, when "sound A" is detected as the environmental signal, "character image A" and "performance image A" are defined to be displayed. For example, when the sound A is the phrase "Good morning" an image in which the character expresses the phrase "Good morning" is displayed as the character image A and an image representing a refreshing morning is displayed as the performance image A. In addition, the performance image A may include a speech balloon in which the text "Good morning" is displayed.

When "action C" is detected as the environmental signal, "character image C" and "performance image C" are displayed. For example, when the action C is "home return of a user" an image in which the character expresses "Welcome home" is displayed as the character image C and a performance image for welcoming the home return is displayed as the performance image C. In addition, the performance image C may include a speech balloon in which the text "Welcome home" is displayed.

At the timing of "time D," "character image D" and "performance image D" are displayed. For example, when "6 AM" is set as an alarm time as the time D, an image indicating a state in which a character wakes the user up may be displayed as the character image D when the time reaches 6 AM and an image of waking up may be displayed as the performance image D. In addition, the performance image D may include a speech balloon in which the text "It's morning" is displayed.

At the timing when "signal E" is received, "character image E" and "performance image E" are displayed. For example, when the signal E is a "toothbrush" signal transmitted from the communication terminal of the user, an image indicating a state in which the character brushes his/her teeth may be displayed as the character image E and a refreshing image suitable for brushing teeth may be displayed as the performance image E if the signal E is received. In addition, the performance image E may include the text "brushing."

In addition, in the image data 751, a display condition including time information together with environmental information may be defined. For example, the image data 751 can be defined so that the character image and the performance image to be displayed are different between morning and afternoon even if the environmental information is the same.

Further, in the image data 751, a display condition including a reception signal together with environmental information may be defined.

The sound data 752 is data in which an output condition to output sound and information to specify sound to be output due to the condition are associated.

In the example of the sound data 752 illustrated in FIG. 7B, "sound A" is defined to be output when "sound A" is detected as the environmental signal. For example, when the sound A is the phrase "Good morning," "Good morning" is output as the sound A with the character's sound.

When "action C" is detected as the environmental signal, "sound C" is output. For example, when the action C is "home return of the user," "Welcome home" is output as the sound C with the character's sound.

At the timing of "time D," "6 AM" is output as sound D with the character's sound.

At the timing when "signal E" is received, a tooth brushing sound or a gargling sound of the character is output as sound E.

Further, in the sound data 752, an output condition including time information together with environmental information may be defined. For example, the sound data 752 can be defined so that sound is different between morning and afternoon even if the environmental information is the same.

Further, in the sound data 752, an output condition including a received signal together with the environmental information may be defined.

The signal data 753 is data in which a condition for outputting an operation signal to operate an external electrical device such as a home appliance and an operation signal to be transmitted due to the condition are associated.

In the example of the signal data 753 illustrated in FIG. 7C, "operation signal F" is defined to be output when "sound F" is detected as the environmental signal. For example, when the sound F is the phrase "turn off the TV," an operation signal F that turns on the power supply of TV is output.

As illustrated in FIG. 8, even for the same term or action, an image or sound output in accordance with a date and time may be different. For example, when the sound "Good morning" is detected, a sound for encouraging the user for one day such as the sound "Good morning. Do your best today, too!" is output if it is a weekday morning and a sound for relieving the fatigue of weekdays such as the sound "Good morning. You can relax today" is output if it is a holiday morning. On the other hand, if it is night, the sound "What are you talking about? Look at what time it is" is output. Therefore, it is possible to prevent unnatural mechanical exchanges in daily life. Thereby, the user can feel more familiar with the character.

The user data 754 has various pieces of information about the user such as the user's profile, attributes, and preferences. By the user's name is provided in the user data 754, the image display apparatus 1 can output, for example, the user's name by sound. At this time, a nickname or the like as well as the name may be registered. Thereby, the character can call the user by his/her name. Therefore, the user can feel close to the character and feel more familiar with the character.

By inputting an address of the user or an address of the company in the user data 754, the image display apparatus 1 can acquire information about the user's behavior range, for example, using the Internet or the like, and output it as a sound or an image. Thereby, the character can notify the user of various information. Therefore, the user can feel close to the character and feel more familiar with the character.

By inputting a date of birth of the user in the user data 754, the image display apparatus 1 can output an image or sound for celebrating a birthday, for example, on the user's birthday. Thereby, the character can celebrate the user's birthday. Thereby, the user can feel close to the character and feel more familiar with the character.

By inputting a phone number of a mobile phone of the user in the user data 754, the image display apparatus 1 can make a call to the mobile phone, for example, while the user is out. Thereby, the user can receive a call from a character waiting at home while he/she is out. Thereby, the user can feel close to the character and feel more familiar with the character.

In addition, the user data 754 can have information about a favorite animation, a comic, a novel, a game, a movie, a favorite character, a hobby, something of interest, a weight, a height, an occupation and the like. On the basis of such information on the user, the image display apparatus 1 can display an image or output a sound from a topic in which the user is interested. In addition, such information can be generated from a result of a questionnaire or the like, a history of a social networking service (SNS) used by the user and the like. The questionnaire may be one in which the character of the image display apparatus 1 asks the user a question such as "Do you like o?" in through a conversation or a chat or the user may write the questionnaire in response to data like a question list from time to time. In the former case, question content and a string of answers from the user are associated and stored as a part of the user data 754 so that it is possible to select a topic of user preference thereafter.

The conversation history data 755 is history information on the content of the conversation in which the character of the image display apparatus 1 directly interacted with the user. FIG. 9 is a conceptual data diagram showing one specific example of the conversation history data 755. As illustrated in FIG. 9, the conversation history data 755 is information indicating the execution of a conversation and includes information in which utterer information 901 indicating whether an utterance is a character-side utterance or a user-side utterance, date and time information 902 indicating a date and time of the utterance, and conversation content information 903 indicating specific content of the conversation are associated. For example, in the example of FIG. 9, it can be seen that, when the character says "Today, there is a baseball TV broadcast" at "2016/07/10 18:30:10," the user answers "Is that so? Thank you for telling me" at "2016/07/10 18:32:20." The conversation content information 903 on the user stores text data of a result of sound recognition executed by the analysis section 712 for the input sound. The conversation content information 903 may be information in which all content of the conversation is a string or may be information obtained by picking up keywords from the content of the conversation. For example, in the example of FIG. 9, if the conversation content is "I like team A," combination information such as "team A, like" may be stored as conversation content information 903. In this case, a keyword to be selected by the image display apparatus 1 may be selected on the basis of a noun in the conversation text. If there is a word expressing the emotion of the user, the word may be picked up and stored. Because the conversation history data 755 is stored in the storage device 75, the image display apparatus 1 can recognize content of a past conversation and can reflect the recognized content to the topic of a subsequent conversation or chat. The conversation history data 755 is additionally updated by the control section 71 every time a conversation is made between the character displayed by the image display apparatus 1 and the user.

The chat history data 756 is history information on content of a chat executed by the character of the image display apparatus 1 with the communication terminal held by the user. FIG. 10 is a conceptual data diagram illustrating one specific history of the chat history data 756. As illustrated in FIG. 10, the chat history data 756 is information indicating which party has produced an utterance in a chat, and includes information in which utterer information 1001 indicating whether the utterance is a user-side utterance or a character-side utterance, date and time information 1002 indicating a date and time on which the utterance was made, and chat content information 1003 that is a string indicating content of a chat made up of the utterances are associated. For example, in the example of FIG. 10, it can be seen that, when the character asks the question "What are you doing now?" by chat at "2016/07/02 19:39:21," the user answers "I'm watching a baseball game at Jingu Stadium" at "2016/07/02 19:40:30." The chat content information 1003 may be information in which all content of the chat is a string or may be information obtained by picking up a keyword from the content of the chat. For example, in the example of FIG. 10, only the keyword "baseball" from the content of the chat "I'm watching a baseball game at Jingu stadium" may be stored or a combination keyword such as "player a, like" may be stored as chat content information 1003 if there is chat content "I like player a." In this case, the keyword selected by the image display apparatus 1 may be selected on the basis of a noun in the chat text. If there is a word expressing the emotion of the user, the word may be picked up and stored. Because the chat history data 756 is stored in the storage device 75, the image display apparatus 1 can recognize content of a past chat and reflect the recognized content to a topic of a subsequent chat or conversation. The chat history data 756 is additionally updated by the control section 71 every time a chat is performed between the character displayed by the image display apparatus 1 and the user.

Random conversation data 757 is data related to selection of a topic when a character performs a conversation or chat at random. As illustrated in FIG. 11, the random conversation data 757 is information in which a keyword 1101, a condition 1102, and a conversation or chat content 1103 are associated. The keyword 1101 is a word that triggers a conversation and is information to be used by the control section 71 for comparing it with topics in the conversation history and the chat history recorded in the conversation history data 755 and the chat history data 756. When the keyword included in the conversation history and the chat history matches any one of keywords 1101, the conversation or chat content 1103 is output as a sound or output as text of a chat. The condition 1102 is a condition that needs to be achieved before the character talks or chats about the corresponding conversation or chat content, and when there is no condition are also included. Examples of such conditions are various and include specific weather (sunny, rainy, snowy or the like), input of a specific sound, and inclusion of specific information (e.g., a broadcast of a certain program) in input information (for example, television program information). The conversation or chat content 1103 is information indicating actual content of a conversation or chat to be executed when the keyword included in the conversation history or the chat history matches the keyword 1101 and the condition 1102 is satisfied. When a plurality of pieces of conversation or chat content can be detected by the control section 71, one of them may be randomly selected, or one having a high matching rate with the user's preference of the keyword included in the conversation of the selected conversation or chat content may be selected, or one having high consistency with one or more preceding conversations may be selected. Because the random conversation data is stored, the control section 71 can perform the next conversation or chat reflecting each past history as a conversation section or a chat section.

The communication section 76 is a communication means that performs bidirectional or unidirectional data communication processing with an external device in a wired or wireless manner. For example, it is possible to transmit and receive various types of data to and from a device connected to the Internet via a LAN cable connected to a LAN port or a wireless link based on a Wi-Fi (registered trademark) module. For example, the communication section 76 can receive a signal transmitted from the user's communication terminal. In addition, the communication section 76 receives information capable of being acquired via the Internet such as weather information receivable from the weather information site and calendar information registered in the calendar site. In addition, the communication section 76 can execute chat communication with the user's communication terminal via a chat server on a network (not illustrated).

The control section 71 can perform control operations as the acquisition processing section 711, the analysis section 712, the display processing section 713, the sound output section 714, the transmission processing section 715, and the data management section 716 in accordance with the image display program P1.

The acquisition processing section 711 acquires a signal detected from at least one of the microphone 704, the camera 722, the human sensor 702, the light sensor 721, the temperature/humidity sensor 611, the vibration sensor 612, the noise sensor 613, and the like.

The analysis section 712 analyzes environmental information acquired by the acquisition processing section 711. For example, the analysis section 712 analyzes words uttered by the user from an environmental signal detected by the acquisition processing section 711 from the microphone 704. For example, the analysis section 712 can specify the words uttered by the user from the sound acquired by the microphone 704 using a language model and a sound model registered in advance in the storage device 75. The language model is data in which a set of word information of a used language among languages used by the image display apparatus 1 or various wordings are registered. The sound model is a model of a sound signal of a used language, for example, a signal indicating a frequency characteristic. Specifically, it is a standard model of a sound of each character such as "あ (A)," "い (I)," . . . , "a," or "b." Thus, it is possible to specify the input sound of the user by pattern matching. In addition, in this manner, the image display apparatus 1 can display an image determined in accordance with the words uttered by the user, and can output a sound decided in accordance with the words. The storage device 75 may have voiceprint information as user data concerning the user who is the owner of the image display apparatus 1 so that the sounds of the user who is the owner can be recognized.

When the analysis section 712 cannot analyze the words uttered by the user, the image display apparatus 1 reacts in another method without outputting a normal mechanical sound such as "Please repeat" or the like to request the user to repeat himself/herself. For example, the image display apparatus 1 guides repetition by outputting the sound "Could you come closer?" or "Could you talk a little softer?" In addition, the image display apparatus 1 may output a sound of an appropriate phrase such as "Oh!" "Is that so?" or "I see" or may output a sound of a filler expression such as "hmm" or "well."

In addition, the analysis section 712 analyzes a position or action of the user from the environmental signal detected by the acquisition processing section 711 from the camera 722. Specifically, the analysis section 712 can detect a face of a person from an image as image analysis. In addition, the storage device 75 may have face information of the user as user data related to the user who is the owner so that the face of the user who is the owner can be recognized from the detected face of the person.

By specifying the user who is the owner, the image display apparatus 1 can display an image or output a sound in which the character interacts intimately with the user who is the owner. On the other hand, the image display apparatus 1 can display an image or output a sound for unfamiliar interaction or a greeting such as self-introduction for persons other than the owner. Thereby, the user can feel more familiar with the character displayed on the image display apparatus 1.

In addition, the analysis section 712 may generate other environmental information detected by another sensor or the like or a result obtained by combining button operations into one piece of environmental information in addition to the analyzed words uttered by the user and the user's position or action. For example, in addition to a sound or an image, it is possible to determine whether the user is going out or returning home as will be described below from the detection result of the human sensor.

The display processing section 713 reads the image data 751 from the storage device 75 and selects character image information and performance image information associated with the display condition corresponding to the environmental signal acquired by the acquisition processing section 711 from the image data 751. In addition, the display processing section 713 outputs the image corresponding to the selected character image information and performance image information to the output section 73 for display. In addition, the display processing section 713 may display the character image and the performance image in accordance with the environmental information and time information. Further, the display processing section 713 may display the character image and the performance image in accordance with the environmental information and the received signal.

The sound output section 714 reads the sound data 752 from the storage device 75 and selects sound information associated with the output condition corresponding to the environmental signal acquired by the acquisition processing section 711 from the sound data 752. In addition, the sound output section 714 outputs a sound corresponding to the selected sound information to the output section 73. In addition, the sound output section 714 may output a sound in accordance with the environmental information and time information. Further, the sound output section 714 may output a sound in accordance with the environmental information and the received signal.

The transmission processing section 715 reads the signal data 753 from the storage device 75 and selects an operation signal associated with the environmental signal acquired by the acquisition processing section 711 from the signal data 753. In addition, the transmission processing section 715 outputs the read operation signal to the output section 73.

The data management section 716 obtains time information from a clock built in the image display apparatus 1 or an external clock. When an image to be displayed or a sound is determined in accordance with a time, control signals are output to the display processing section 713 and the sound output section 714 in accordance with this display and output schedule.

In addition, the data management section 716 accesses the weather information site when the image display apparatus 1 is activated, acquires weather information of that day, and stores the acquired weather information in the storage device 75. Further, the data management section 716 can periodically access the calendar site where the user's schedule is registered and cause the storage device 75 to store the latest calendar information obtained by the access. In addition, the data management section 716 can cause remote control information (infrared information) on the external device to be received from a remote controller of an external device such as a television or a light by the infrared light reception section 707, cause the storage device 75 to store (learn) the information, and cause the infrared information for operating the external device to be transmitted from the infrared LED 703 on the basis of this remote control information. The data management section 716 can also access various data on the network and collect various data that can be used for a conversation or a chat with the user.

Operation

Figure 12:
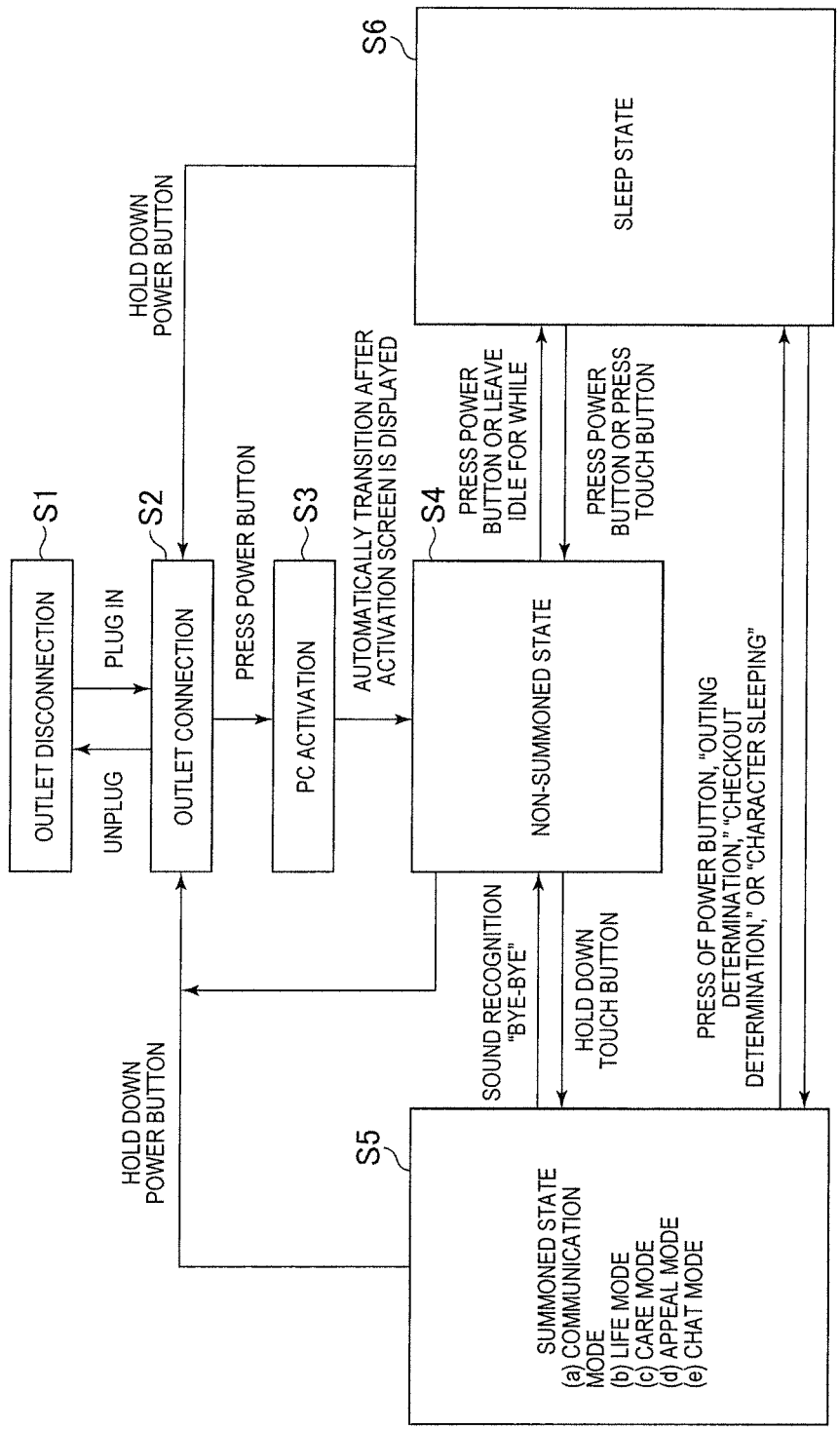
FIG. 12 is a diagram illustrating state transition in an image display apparatus according to the example.

In the image display apparatus 1, a process such as the display of an image or the output of sound is executed according to each state such as "sleep state," "non-summoned state" or "summoned state." As illustrated in FIG. 12, in the image display apparatus 1, a power button (not illustrated) is not effective where the outlet is in a disconnected state (S1), but the power button is effective when a plug is inserted into the outlet and the outlet is in a connected state (S2).

Non-Summoned State

When the power button is pressed in the state (S2) in which the outlet is connected, the control section 71 is activated (S3). With this activation, for example, an activation screen is displayed and is shifted to the "non-summoned state" (S4). The "non-summoned state" is a state in which the image display apparatus 1 is powered on and the projector 4 is activated, but the character image is not displayed and an image for the non-summoned state is displayed. In the non-summoned state, the projector 4 is activated, but the speaker 705, the camera 722 and the like are not activated and no environmental signal can be detected. In the non-summoned state, the status LED 708 of the image display apparatus 1 is turned on.

Summoned State

When the touch button 26 is held down in the non-summoned state (S4), the state is shifted to the "summoned state" (S5). Holding the touch button 26 down means that the touch button 26 is touched by the user for a predetermined period of time or more (for example, 3 seconds or more). This summoned state is a state in which a process of displaying an characteristic image and outputting a characteristic sound is executed in the image display apparatus 1. In the summoned state, the image display apparatus 1 is in a state in which the projector 4 is activated and a character image is displayed, and the speaker 705, the camera 722, and the like are activated, and the environmental signal can be detected. In addition, in the "summoned state," there are modes such as (a) communication mode, (b) life mode, (c) care mode, (d) appeal mode, and (e) chat mode, and a predetermined process is executed in each mode.

Sleep State

When the power button is pressed in the non-summoned state (S4) or left idle for a predetermined period of time, the state is shifted to the "sleep state" (S6). "Left idle for a predetermined period of time" means, for example, a state in which the touch button 26 is not held down for a predetermined period of time or more (for example, 20 minutes or more). The sleep state is a state of a power saving standby mode in which the projector 4 is not activated, and the speaker 705, the camera 722 and the like are not activated either. In the image display apparatus 1 in the sleep state, the status LED 708 is turned on.

When the power button is pressed or the touch button 26 is touched by the user in the sleep state, the image display apparatus 1 is shifted to the non-summoned state. The fact that the "touch button is touched" means that the touch button 26 is touched by the user for a period of time less than a predetermined period of time (for example, less than 3 seconds).

Next, (a) communication mode, (b) life mode, (c) care mode, (d) appeal mode, and (e) chat mode will be described in the summoned state.

(a) Communication Mode

In the communication mode, a character image is displayed and a character and a user can communicate with each other. Specifically, in the communication mode, the image display apparatus 1 displays a character image according to the environmental signal acquired by the acquisition processing section 711. In addition, the image display apparatus 1 displays a performance image according to the environmental signal. Further, the image display apparatus 1 outputs a sound in accordance with the environmental signal.

When the touch button is held down from the non-summoned state and the state is shifted to the summoned state, the image display apparatus 1 first enters the communication mode. In addition, the image display apparatus 1 is shifted to the life mode when the environmental signal is not acquired continuously for a predetermined period of time or more (for example, 10 minutes or more) during the communication mode and a signal such as an operation signal is not received.

Figure 13A:
FIG. 13A is an example of an image displayed on the image display apparatus according to the example.

For example, in the image display apparatus 1, when the phrase "What's the weather like today?" uttered by the user as the environmental signal is detected by the microphone 704, the speaker 705 outputs a sound such as "It's sunny today" on the basis of weather information stored in the storage device 75 by the data management section 716 in accordance with the detected phrase. In addition, in the image display apparatus 1, a character image of an action representing pleasure to sunshine is displayed on the transmission film 3. Further, in the image display apparatus 1, a performance image for representing sunny weather is displayed on the transmission film 3. As illustrated in FIG. 13A, the performance image may be a combination with text data such as the display of the text "It's sunny today" by speech balloon in addition to only a simple image. Thereby, the user can feel as if he/she were living with the character who told him/her about today's weather and feel more familiar with the character. The performance image is not indispensable and may be switched between the display and non-display at random.

Figure 13B:
FIG. 13B is another example of an image displayed on the image display apparatus according to the example.

In addition, for example, in the image display apparatus 1, when the user approaches the image display apparatus 1 and the user's face is detected in a large size by the camera 722, the speaker 705 outputs a sound such as "You're too close" in accordance with the detection. In addition, in the image display apparatus 1, a character image in which a shy action due to the approach of the user's face is performed is displayed on the transmission film 3. Further, in the image display apparatus 1, a performance image for representing the shy emotion of the character is displayed. As illustrated in FIG. 13B, the performance image may be a combination with text data such as the display of the text "You're too close" in a speech balloon in addition to only a simple image. Thereby, the user can feel as if he/she were living with a character who gets shy when he/she is too close and can feel more familiar with the character.

Figure 13C:
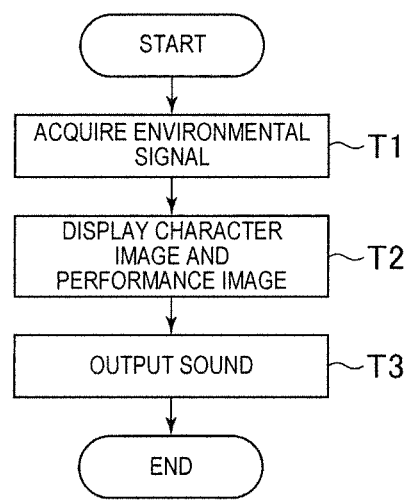
FIG. 13C is a flowchart illustrating a process in the image display apparatus according to the example.

In this case, for example, as illustrated in FIG. 13C, when the image display apparatus 1 acquires an environmental signal (T1), the image display apparatus 1 displays the character image of the character in accordance with the acquired environmental signal, and displays a performance image for representing the character's emotional expression in accordance with the environmental signal (T2). In addition, the image display apparatus 1 outputs a sound corresponding to the acquired environmental signal (T3). It is preferable that steps T2 and T3 be executed at the same time.

Further, for example, in the image display apparatus 1, when the user presses the touch button 26 a plurality of times and performs an action to interfere with the action of calling the character a plurality of times, the sound "What is it?" is output from the speaker 705 in accordance with the action. In addition, in the image display apparatus 1, a character image in which an interference action is performed is displayed on the transmission film 3 by the user calls for the character a plurality of times. Further, in the image display apparatus 1, a performance image for asking about the plurality of times the user called for the character is displayed on the transmission film 3. Thereby, the user can feel more familiar with the character for whom he/she called the plurality of times and can feel as if he/she were living with the character.

In addition, for example, in the image display apparatus 1, when a signal to send an object to the character is transmitted from the communication terminal of the user, a pleasing sound for the object is output from the speaker 705 and a character using the transmitted object is displayed on the transmission film 3.

Figure 14A:
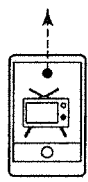
FIG. 14A is a diagram illustrating a communication mode in the image display apparatus according to the example.
Figure 14B:
FIG. 14B is a diagram illustrating the communication mode in the image display apparatus according to the example.

As illustrated in FIG. 14A, the user's communication terminal is operated to transmit "TV" to the character of the image display apparatus 1. Then, in the image display apparatus 1, as illustrated in FIG. 14B, the TV is displayed as a performance image. In addition, in the performance image, for example, a speech balloon may include text saying "Let's watch TV together." In this case, in the image data 751, the character image and the performance image illustrated in FIG. 14B are associated with a transmission signal for transmitting the TV.

Further, in the image display apparatus 1, a sound saying "Let's watch TV together" is output. In this case, in the sound data 752, the sound saying "Let's watch TV together" is output in the transmission signal for transmitting the TV.

Figure 14C:
FIG. 14C is a diagram illustrating the communication mode in the image display apparatus according to the example.

Then, when the target TV program ends, a performance image including text saying "That was interesting" in a speech balloon may be displayed on the image display apparatus 1 as illustrated in FIG. 14C. At the same time, the image display apparatus 1 outputs the sound saying "That was interesting." In this case, in the image data 751, a performance image including "That was interesting" is associated on the condition that a predetermined period of time have elapsed after the reception of the transmission signal for transmitting the TV (the TV program has ended). In addition, in the sound data 752, the sound "That was interesting" is associated on the condition that a predetermined time have elapsed after the reception of the transmission signal for transmitting the TV (the TV program have finished). Because "interesting" may not be suitable for the content of the TV program, it is also possible to select and output the sound of an appropriate comment as an impression.

In addition, when the user laughs while watching TV, the image display apparatus 1 may output a laughing sound of the character at the same time when the user's laughter is detected. By outputting the above-described character image, performance image, and sound, the user can feel as if he/she were watching TV with the character.

For example, when the input device of the user's communication terminal is a touch panel, the transmission operation can be executed by flicking an image of a substance to be transmitted in the direction of the image display apparatus 1.

Figure 14D:
FIG. 14D is a diagram illustrating the communication mode in the image display apparatus according to the example.
Figure 14E:
FIG. 14E is a diagram illustrating the communication mode in the image display apparatus according to the example.

As illustrated in FIG. 14D, the user's communication terminal is operated to transmit "coffee" to the character of the image display apparatus 1. Then, in the image display apparatus 1, as illustrated in FIG. 14E, the coffee is displayed as a performance image. In addition, in the performance image, for example, text saying "Let's take a coffee break" may be included in the speech balloon. In this case, in the image data 751, the character image and the performance image illustrated in FIG. 14E are associated with a transmission signal for transmitting the coffee.

Further, in the image display apparatus 1, the sound saying "Let's take a coffee break" is output. In this case, in the sound data 752, the sound saying "Let's take a coffee break" is output in the transmission signal for transmitting the coffee.

Figure 14F:
FIG. 14F is a diagram illustrating the communication mode in the image display apparatus according to the example.

Then, when a predetermined period of time (for example, 10 minutes) has elapsed, the image display apparatus 1 may display a performance image including text saying "That was good" in the speech balloon as illustrated in FIG. 14F. At the same time, the image display apparatus 1 outputs a sound saying "That was good." In this case, in the image data 751, the performance image including "That was good" is associated on the condition that a predetermined period of time have elapsed after the reception of the transmission signal for transmitting the coffee. In addition, in the sound data 752, the sound "That was good" is associated on the condition that a predetermined period of time have elapsed after the reception of the transmission signal for transmitting the coffee.

In addition, while the character drinks the coffee, the image display apparatus 1 may display a moving image in which the character drinks the coffee, or output a sound such as "This is delicious." By outputting the above-described character image, performance image and sound, the user can feel as if he/she were drinking coffee with the character.

Figure 14G:
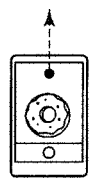
FIG. 14G is a diagram illustrating the communication mode in the image display apparatus according to the example.
Figure 14H:
FIG. 14H is a diagram illustrating the communication mode in the image display apparatus according to the example.

As illustrated in FIG. 14G, the user's communication terminal is operated to transmit "food (a donut in FIG. 14G)" to the character of the image display apparatus 1. Then, in the image display apparatus 1, the food is displayed as a performance image as illustrated in FIG. 14H. In addition, in the performance image, for example, text saying "Thank you" may be included in the speech balloon. In this case, in the image data 751, the character image and the performance image illustrated in FIG. 14H are associated with a transmission signal for transmitting the food.

Further, in the image display apparatus 1, the sound saying "Thank you" is output. In this case, in the sound data 752, the sound saying "Thank you" is output in the transmission signal for transmitting the food.

Figure 14I:
FIG. 14I is a diagram illustrating the communication mode in the image display apparatus according to the example.

Then, when a predetermined period of time (for example, 10 minutes) has elapsed, a performance image including the text "That was delicious" in the speech balloon may be displayed on the image display apparatus 1 as illustrated in FIG. 14I. At the same time, the image display apparatus 1 outputs the sound "That was delicious." In this case, in the image data 751, the performance image including "That was delicious" is associated on the condition that a predetermined period of time have elapsed after the reception of the transmission signal for transmitting the food. In addition, in the sound data 752, the sound "That was delicious" is associated on the condition that a predetermined period of time have elapsed after the reception of the transmission signal for transmitting the food.

The performance image can also be represented as if the object had jumped from the user's communication terminal to the image display apparatus 1. At this time, for example, performance can be represented so that yellow light or the like is shined at the time of transmission and the light is turned off when the character image has the object.

In addition, in addition to the transmission of an object from the communication terminal to the image display apparatus 1, the object may be represented as being transmitted from the image display apparatus 1 to the user terminal. For example, when the image display apparatus 1 operates a coffee maker, a coffee cup can be represented as being transmitted from the character to the communication terminal.

Figure 15A:
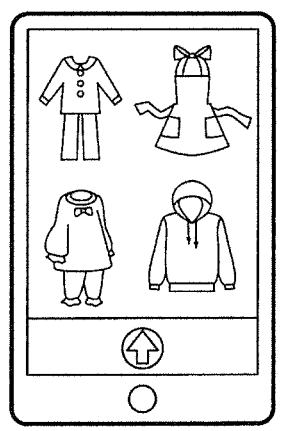
FIG. 15A is a diagram illustrating the communication mode in the image display apparatus according to the example.
Figure 15B:
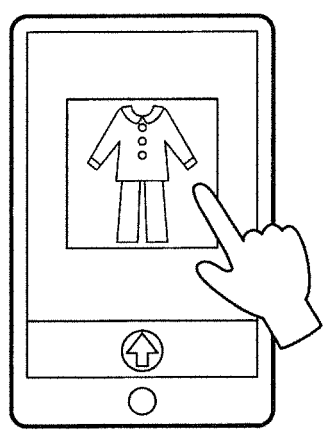
FIG. 15B is a diagram illustrating the communication mode in the image display apparatus according to the example.
Figure 15C:
FIG. 15C is a diagram illustrating the communication mode in the image display apparatus according to the example.

As illustrated in FIG. 15B, it is possible to select any one of clothing and accessories and transmit the selected clothing or the like from among a plurality of types of clothing and accessories displayed on the user's communication terminal as illustrated in FIG. 15A. Then, in the image display apparatus 1, as illustrated in FIG. 15C, a character image of a character wearing the transmitted clothing is displayed. In addition, in the performance image, for example, text saying "Thank you" may be included in the speech balloon. Further, in the image display apparatus 1, a sound saying "Thank you" is output.

In this case, in the image data 751, the transmission signal is associated with the character image and the performance image illustrated in FIG. 15C. In addition, in the sound data 752, the transmission signal is associated with the sound saying "Thank you."

By outputting the above-described character image, performance image and sound, the user can feel as if he/she were giving a gift to the character. In addition, the user can cause the character to wear his/her favorite clothing. Therefore, the user can feel more familiar with the character.

In addition, when the user transmits data of a toothbrush, the image display apparatus 1 may display an image showing how the character brushes its teeth so that the user can brush his/her teeth with the character. In addition, when the user transmits jump rope or dumbbell data, the image display apparatus 1 may display an image of a state of exercise so that the user can exercise with the character.

In the storage device 75, preference data related to a character's preferences or history data related to items or gifts transmitted in the past may be stored. In this case, when the items or gifts as described above in FIGS. 14A to 15C are transmitted, the response of the character may be varied according to the preferences or history. For example, when an item that the character likes is transmitted, an image and sound in which the character's pleasure is represented more greatly are represented. On the other hand, when an item that the character does not particularly like is transmitted, an image and sound in which the character's pleasure is represented smaller are represented. In addition, if the same item is continuously transmitted, the pleasure may decrease. Further, when a frequency of food transmission increases, it may be expressed as "I'm going to get fat" and the like by an image and sound. In this manner, because the reaction of the character is not always the same, the user can have familiarity with the character.

Further, in the communication mode, the image display apparatus 1 executes a random conversation based on a topic according to content of a past conversation and content of a chat executed by the image display apparatus 1 with the communication terminal of the user in the chat mode to be described below at a predetermined probability (a probability for determining whether to perform a conversation related to past communication as a predefined probability; this probability may be appropriately varied) in addition to the environmental signal acquired by the acquisition processing section 711 when the topic of the conversation with the user is selected.

Specifically, when the human sensor 702 detects a person (user), the control section 71 determines whether a random numerical number (for example, a numerical value of 0 to 100) generated in accordance with a program that generates a random number at a random timing exceeds a predetermined threshold value. When the random numerical number exceeds this threshold value, the control section 71 reads the conversation history data 755 and the chat history data 256 from the storage device 75. Then, a keyword is selected from content of a conversation contained in the conversation content information 903 of the conversation history data 755 and the chat content information 1003 of the chat history data 256, image data and sound data read from the image data 751 and the sound data 752 according to the selected keyword and having a tag matching the keyword are specified, image data specified by the display processing section 713 is output from the projector 4, and sound data specified by the sound output section 714 is output from the speaker 705. Because the conversation related to the topic of the conversation executed by the image display apparatus 1 in the past is performed in a random conversation, the user feels closer to the character displayed on the image display apparatus 1. In addition, because the image display apparatus 1 also conducts a conversation based on the topic related to the content of the chat conducted by the user using his/her own communication terminal, the user can feel closer to the character and feel more familiar with the character. In addition, by performing the sound recognition process on the conversation made by the user, the image display apparatus 1 can obtain the text data of the conversation, add the content of the conversation to the conversation history data 755, and use it in subsequent conversations and chats. For example, in response to chat content saying "I am watching a baseball game" conducted by the user in a chat, the character utters "There is a baseball TV broadcast today" and the user can remember the content of the chat conducted with the character and feel a sense of closeness to the character because the character remembers the content of the chat. In addition, the image display apparatus 1 can output a sound corresponding to an output condition or output a sound of a corresponding conversation of a random conversation from the result of sound recognition.

Hereinafter, a general-purpose operation of the image display apparatus 1 that realizes such a communication mode will be described.

Figure 16:
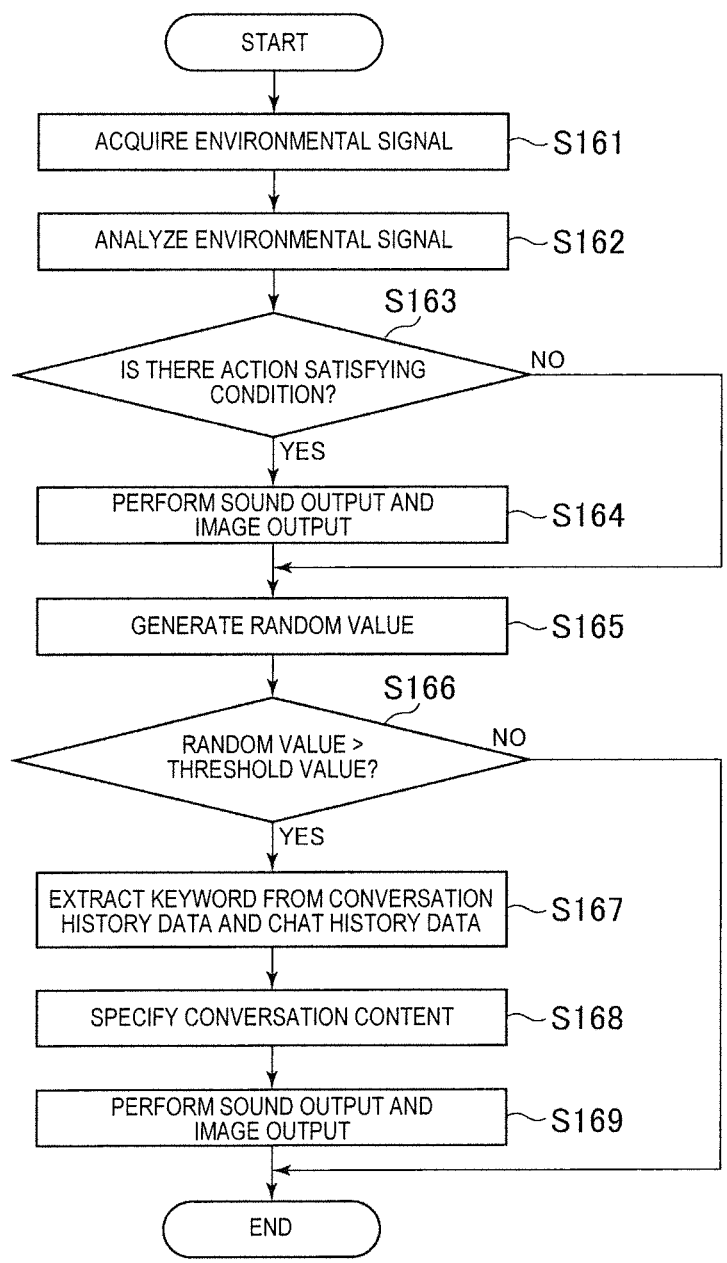
FIG. 16 is a flowchart illustrating an operation in the communication mode of the image display apparatus according to the example.

As illustrated in FIG. 16, the acquisition processing section 711 acquires various environmental signals (S161). The various environmental signals acquired by the acquisition processing section 711 are transferred to the analysis section 712 and the analysis section 712 analyzes the transferred environmental signal (S162). The control section 71 determines whether a character action to be executed by the character matches one of defined conditions with reference to the analysis result, the image data 751, the sound data 752, the signal data 753, and the like (S163). If a result of the determination indicates that there is a character action to be executed (S163: YES), the sound output section 714 outputs a corresponding sound and the display processing section 713 projects a corresponding character image from the projector 4 (S164). If a result of the analysis indicates that there is no character action to be executed (S164: NO), the control section 71 is shifted to the processing of step S165.

In step S165, the control section 71 generates, for example, a random value of 0 to 100 (S165). The random value is not limited to the range of 0 to 100. The control section 71 compares the generated random value with a threshold value for comparison with the generated random value. When the random value is larger than the threshold value (S166: YES), the process proceeds to step S167. When the random value is equal to or smaller than the threshold value (S166: NO), the process is terminated.

In step S167, the control section 71 reads the conversation history data 755 and the chat history data 756. A keyword is extracted from the read conversation content information 903 of the conversation history data 755 and the chat content information 1003 of the chat history data 756. This can be realized by, for example, syntax analysis or the like. Then, for example, a keyword with a highest appearance frequency among recent (for example, from the past day) keywords is selected. The selection of the keyword may be random or the keyword may be selected according to other criteria.

The control section 71 determines whether or not there is a conversation matching the selected keyword and the environmental signal acquired in step S161 with reference to the random conversation data 757 (S168). Then, the sound output section 714 outputs the sound of the specified conversation from the speaker 705. In addition, at this time, if there is a corresponding character image, the display processing section 713 projects the corresponding character image (S169) and terminates the process. For example, if content of the conversation executed by the character is content related to "baseball," an image in which the character wears a baseball uniform is displayed or an image having an item such as a ball or a bat is displayed.

The process of FIG. 16 is repeatedly executed in the communication mode. In this manner, because the character conducts a conversation based on the conversation content interacted with the user in the past and the content of the executed chat in a random conversation, the user can feel the accumulation of a history with the character and feel more familiar with the character.

(b) Life Mode

In the life mode, a character image is displayed and this character image changes in accordance with, for example, time, without depending on an environmental signal. For example, in the morning, the image display apparatus 1 displays an image in which that character makes or eats breakfast or cleans. In the daytime, an image in which the character makes or eats lunch or does ironing is displayed. In the evening, an image in which the character makes or eats dinner or stretches is displayed.

In addition, an image in which the character does laundry, cleans, brushes its teeth, or showers may be displayed. It is also possible to simply display an image in which the character sits on a chair with its legs dangling, an image in which the character operates a communication terminal such as a smartphone while sitting on a chair, an image which the character draws a picture while sitting on a chair or the like. In addition, an image in which the character reads a comic in bed, an image in which the character looks around in bed, an image in which the character sleeps on a bed or the like may be displayed.

In addition, it is possible to manage this frequency or probability, it is also possible to display an image in which a different action is performed according to a day, and an operation time may not be exactly the same or is randomly selected within a certain range. Thereby, it is also possible to display a action that keeps the user interested for a long time. For example, when the user says "That's cute" often when the character is making breakfast, it is possible to lengthen a period of time in which an image in which the character is making breakfast is displayed.

When the touch button 26 is touched during the life mode, the image display apparatus 1 is shifted to the communication mode. In addition, the mode is shifted to the care mode or appeal mode at a predetermined timing in the life mode.

(c) Care Mode

In the care mode, the character image and the performance image are displayed at predetermined timings according to the schedule of the user registered in advance, and the sound corresponding to the timing is output. For example, the image display apparatus 1 outputs a sound such as "Good morning," "Take care," "Good morning" or "Good night."

Figure 17A:
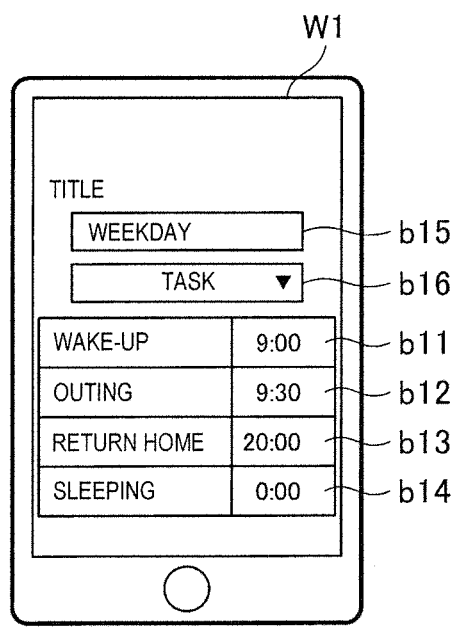
FIG. 17A is a screen example for registering a schedule of a user in the image display apparatus according to the example.

For example, the user inputs times into time input boxes b11 to b14 via a registration screen W1 as illustrated in FIG. 17A in advance using a communication terminal or the like, and registers a "wake-up time," an "outing time," a "home return time" and a "bedtime" of the daily behavior.

Figure 17B:
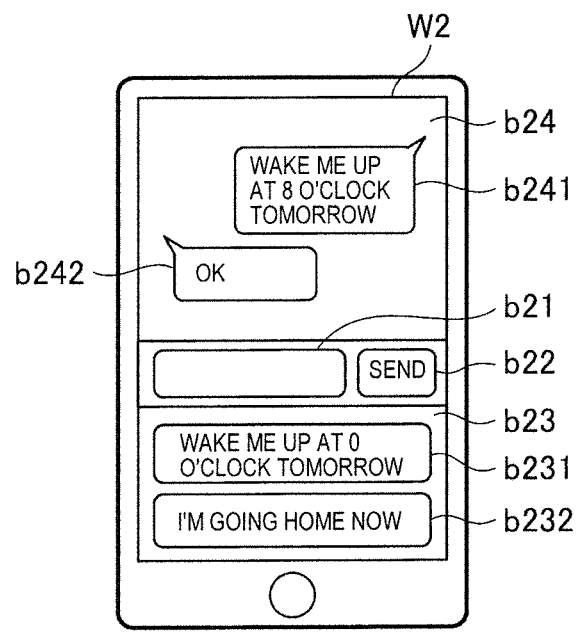
FIG. 17B is an example of a screen for registering a schedule of a user in the image display apparatus according to the example.

Further, if there is a change in this schedule, the schedule can be updated again using this registration screen W1. However, if the schedule is desired to be changed only for one day, the schedule can be changed by a chat screen W2 as illustrated in FIG. 17B by chat mode as will be described below. The chat screen W2 includes an input section b21 that inputs a message to be transmitted, a transmission section b22 that transmits the input message, a message display section b23 that displays a message example, and a message display section b24 that displays the transmitted message.

Figure 18:
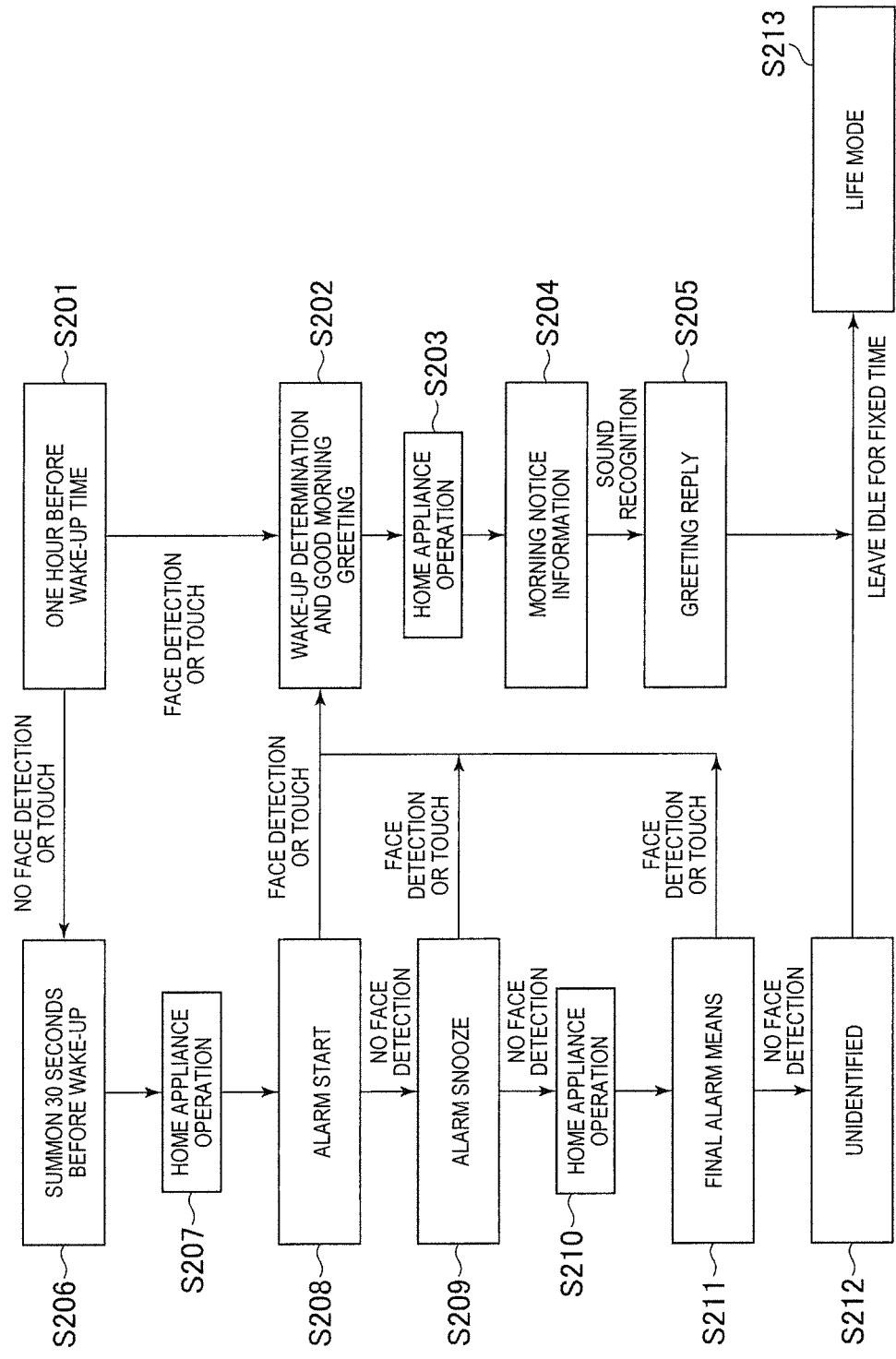
FIG. 18 is a chart illustrating a wake-up mode in the image display apparatus according to the example.

As illustrated in the chart of FIG. 18, the image display apparatus 1 can execute a "wake-up mode." Specifically, the "wake-up mode" is started a predetermined time before the registered wake-up time (for example, "one hour before") (S201).

In this state, when the user's face is detected by the analysis section 712 or when the touch button 26 is touched, it is determined that the user has woken up. On the condition that the user have woken up, a character image and a performance image for the greeting "Good morning" are displayed by the display processing section 713 and the sound output section 714 outputs the greeting "Good morning" (S202).

In addition, words according to the behavior of the user may be output. When the user wakes up earlier than the wake-up time registered by the user, it is possible to output the sound "You're up early." When the user was late on the previous day, it is possible to output the sound "Please do not be late today." When it is detected that the curtain is closed, it is possible to output the sound "Let's open the curtain." If the bedtime of the user on the previous day was late and today's wake-up time is late, it is possible to output the sound "You stayed up late yesterday."

When it is determined that the user wakes up, the transmission processing section 715 transmits an operation signal and operates a predetermined home appliance (S203). For example, when a coffee maker is set as a home appliance to be activated after wake-up, the coffee maker is activated.

In addition, when it is determined that the user wakes up, an image or sound of an information notification in the morning is output (S204). For example, an image or sound for notification of "date," "weather," "temperature" or the like is output.

When a sound uttered by the user is detected with respect to the output of an image or sound relating to the operation of the home appliance and morning information notification, a sound of the character's greeting to the uttered sound is output (S205). For example, when "Thank you" uttered by the user is detected, a sound such as "You're welcome" is output as the character's sound. Thereafter, when the predetermined period of time has elapsed, the mode is shifted to the life mode (S213).

In addition, in the non-summoned state, when the user's face is not detected by the analysis section 712 or the touch button 26 is not touched a predetermined time before the wake-up time (for example, 30 seconds before), the state becomes the summoned state (S206).

When the non-summoned state changes to the summoned state, the transmission processing section 715 transmits an operation signal and operates a home appliance registered in advance (S207).

In addition, when the user's face is not detected by the analysis section 712 until the wake-up time, the display processing section 713 displays an image to wake the user up, and the sound output section 714 outputs a sound to wake the user up, and starts the wake-up function (S208). For example, as a sound to wake the user up, the character's sound such as "It's morning" is given.

When the user's face is detected by the analysis section 712 or when the touch button 26 is touched, the process proceeds to step S202. On the other hand, when the user's face is not detected and the touch button 26 is not touched, the output of the image and the sound to wake the user up continue as a snooze function (S209). For example, the sound to wake the user up can be gradually increased. In addition, an amount of light output from the image display apparatus 1 may be increased.

When the user's face is detected by the analysis section 712 or when the touch button 26 is touched, the process proceeds to step S202. On the other hand, when the user's face is not detected and the touch button 26 is not touched, the transmission processing section 715 transmits an operation signal to operate the home appliance registered in advance (S210).

Further, an image and a sound to wake the user up are set as the image and sound of the final means (S211). For example, the display processing section 713 displays an image in which the character strikes a frying pan. In addition, for example, the sound output section 714 outputs a sound including a sound in which the frying pan is struck while the character says "You're going to be late if you don't get up."

Thereafter, when the user's face has been detected by the analysis section 712 or when the touch button 26 has been touched, the process proceeds to step S202. On the other hand, when the face detection is performed by the analysis section 712 and the touch button 26 is detected, the image display apparatus 1 makes the state of the user unknown (S212) and is shifted to the life mode (S213).

Figure 19:
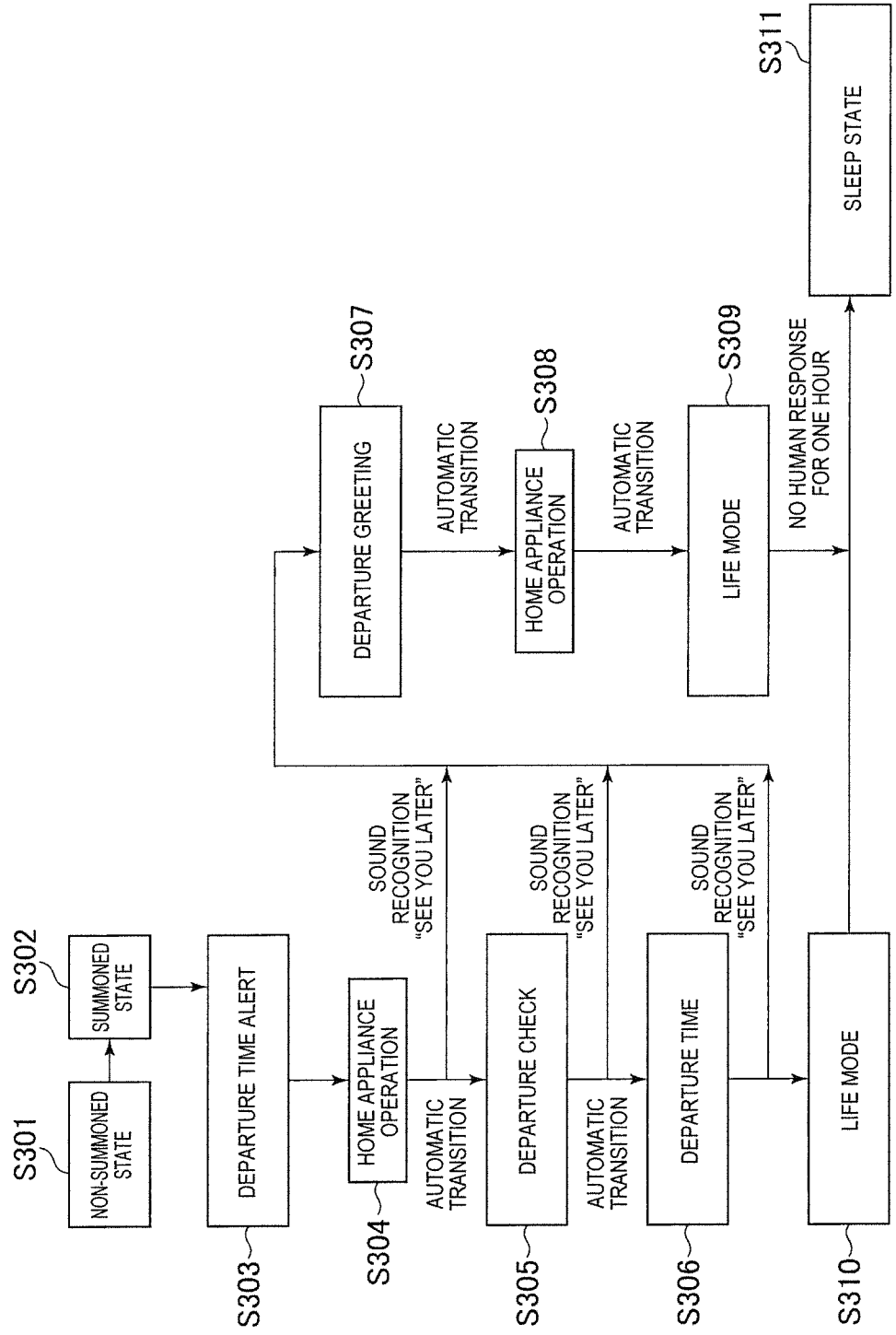
FIG. 19 is a chart illustrating an outing mode in the image display apparatus according to the example.

As shown in the chart of FIG. 19, the image display apparatus 1 can execute the "outing mode." Specifically, the "outing mode" is started a predetermined time before the registered outing time (for example, "5 minutes before"), and the state is shifted from the non-summoned state (S301) to the summoned state (S302).

In addition, when a departure time arrives, an alert image and sound are output (S303). For example, an alert is an image of a character which prompts a user to hurry, the character's sound "It's time to go" or the like.

In addition, the transmission processing section 715 transmits an operation signal and operates a predetermined home appliance (S303).

Further, the display processing section 713 displays an outing check image, and the sound output section 714 outputs an outing check sound (S304). For example, an image or sound for the notification of confirmation of a schedule, confirmation of a forgotten object, confirmation for prompting the user to take an umbrella when the probability of precipitation is high or the like is output.

In addition, when the departure time has arrived, the display processing section 713 outputs an image for an urgent departure, and the sound output section 714 outputs a sound for an urgent departure (S305). For example, a moving image in which the character hurriedly moves and the character's sound such as "It's time to go already! You're late" are given.

When the analysis section 712 has detected the user's sound of "See you later," the display processing section 713 displays an image according to the user's sound, and the sound output section 714 outputs a sound according to the user's sound (S306). For example, the display processing section 713 displays an image in which the character waves to the user. In addition, the sound output section 714 outputs a sound such as "Take care." In addition, the sound to be output may be changed according to a registered schedule of the user, a behavior history of the user or the like.

Thereafter, the transmission processing section 715 transmits an operation signal and operates a predetermined home appliance (S307).

After notification of the departure time in step S305 or after the operation of the home appliance in step S307, the mode is shifted to the life mode (S308 or S309). Further, when a person has not been detected by the human sensor 702 after the passage of a predetermined time (for example, 10 minutes), the state is shifted to the sleep state (S310).

Figure 20:
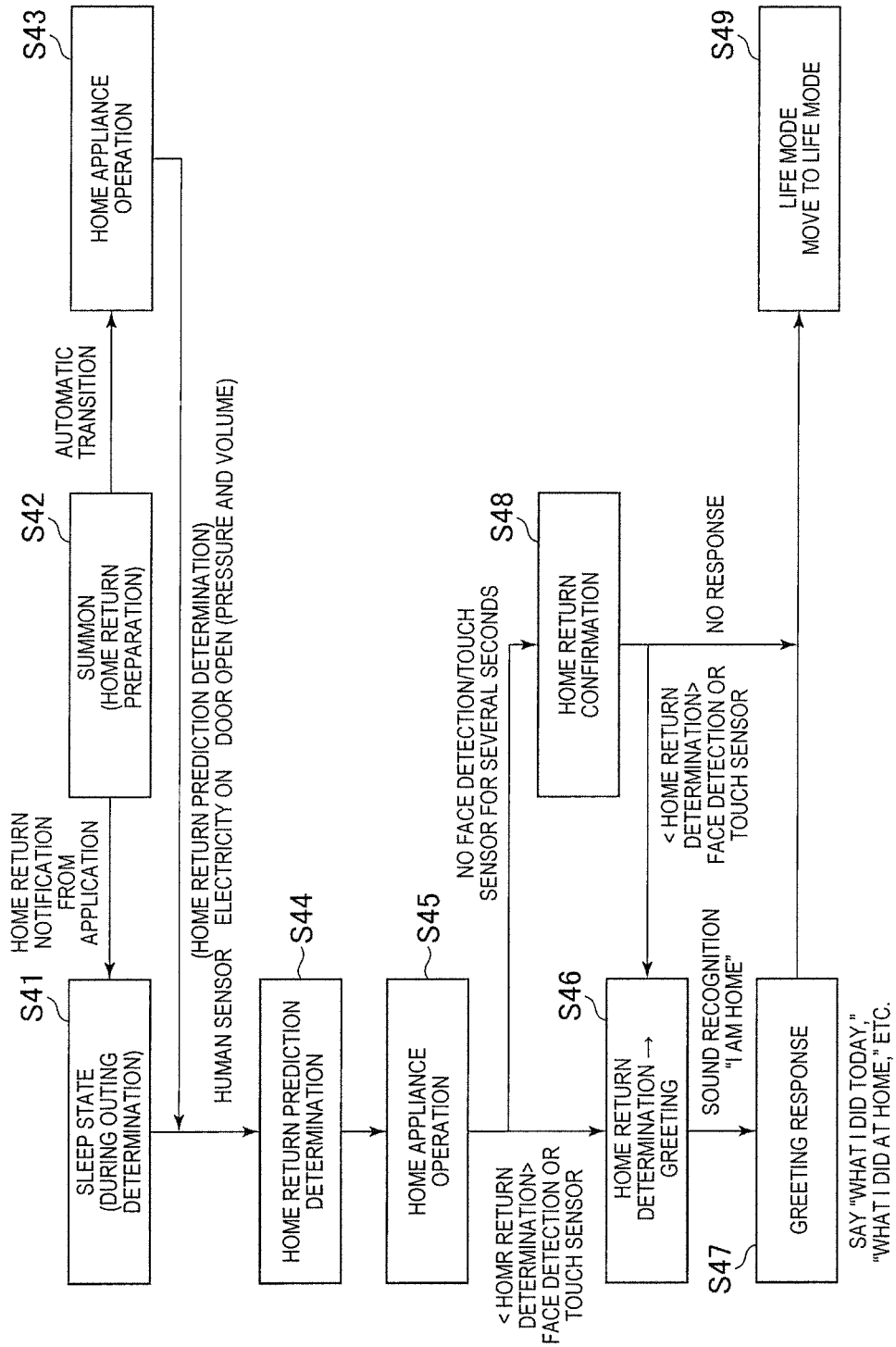
FIG. 20 is a chart illustrating a home return mode in the image display apparatus according to the example.

As illustrated in FIG. 20, the image display apparatus 1 can perform an "outing/home return determination" according to an environmental signal, and can execute the "home return mode" according to the determination. Specifically, after outing is determined in the "outing mode" described above with reference to FIG. 15, when the image display apparatus 1 is in the sleep state (S41), the state is shifted to the summoned state as the home return preparation if a message of a home return schedule is received from the user's communication terminal (S42).

Thereafter, the transmission processing section 715 transmits an operation signal and operates a predetermined home appliance (S43).

In addition, the image display apparatus 1 determines "home return prediction" which is predicting that the user has returned home at the timing when a person is detected by the human sensor 702, the timing when the power supply of a house light is turned on, or the timing when a door is opened (S44). The opening and closing of the door can be determined by detection of a change in air pressure by an atmospheric pressure sensor (not illustrated) or detection of a sound by the noise sensor 613. In addition, when the home return prediction is determined, the sound output section 714 may output a sound such as "It looks like you're back."

When the home return prediction is determined, the transmission processing section 715 transmits an operation signal and operates a predetermined home appliance (S45).

In addition, when the user's face is detected by the analysis section 712 or when the touch button 26 is touched, the image display apparatus 1 determines that the user has "returned home." On the condition that the user have returned home, the display processing section 713 displays a character image and a performance image for a greeting corresponding to the return home, and the sound output section 714 outputs the sound of the greeting corresponding to the return home (S46). For example, the greeting corresponding to the return home is not limited to "Welcome home," but can include a sound determined on the basis of a daily behavior history of the user such as "You're late again today," "You're early today," "You're late today" or "Good work today."

When a sound uttered by the user is detected, the character's sound of a response to the detected sound is output (S47). For example, the character may output a sound such as "I ate a donut yesterday, so I exercised today," representing what the character did on that day. In addition, the character may also let the user know what happened at home. For example, when the doorbell rang a plurality of times, a sound such as "Someone was here today" may be output.

On the other hand, when the return home cannot be determined for a predetermined period of time (for example, 30 seconds) after the home return prediction is determined, home return confirmation is performed (S48). For example, in the home return confirmation, the sound output section 714 outputs a sound such as "Are you home? Please show me your face." In addition, the display processing section 713 displays a rebellious character image or an angry character image and a performance image.

After a reply to the user's greeting in step S47 or after the home return confirmation in step S48, the mode is shifted to the life mode (S49).

(d) Appeal Mode

In the appeal mode, a character image and a performance image according to each condition are displayed according to a signal detected according to a time, a sensor or the like, and a sound corresponding to each condition is output. For example, the image display apparatus 1 can output a sound such as "It is already 8 o'clock," according to the time. In addition, the image display apparatus 1 can output a sound such as "It's kind of hot," according to temperature. Thereby, because the character talks at an unexpected timing, the user can feel more familiar with the character.

(e) Chat Mode

When the user is away from the image display apparatus 1, for example, when the user is away from home, the chat mode realizes the transmission and reception of messages with the communication terminal held by the user. The communication terminal held by the user is, for example, a portable communication terminal such as a smartphone or a mobile phone.

The basic algorithm in the chat mode can be performed as in the conversation with the user. However, the image display apparatus 1 performs a chat using a string on the chat as an input instead of a sound input from the user.

Figure 21:
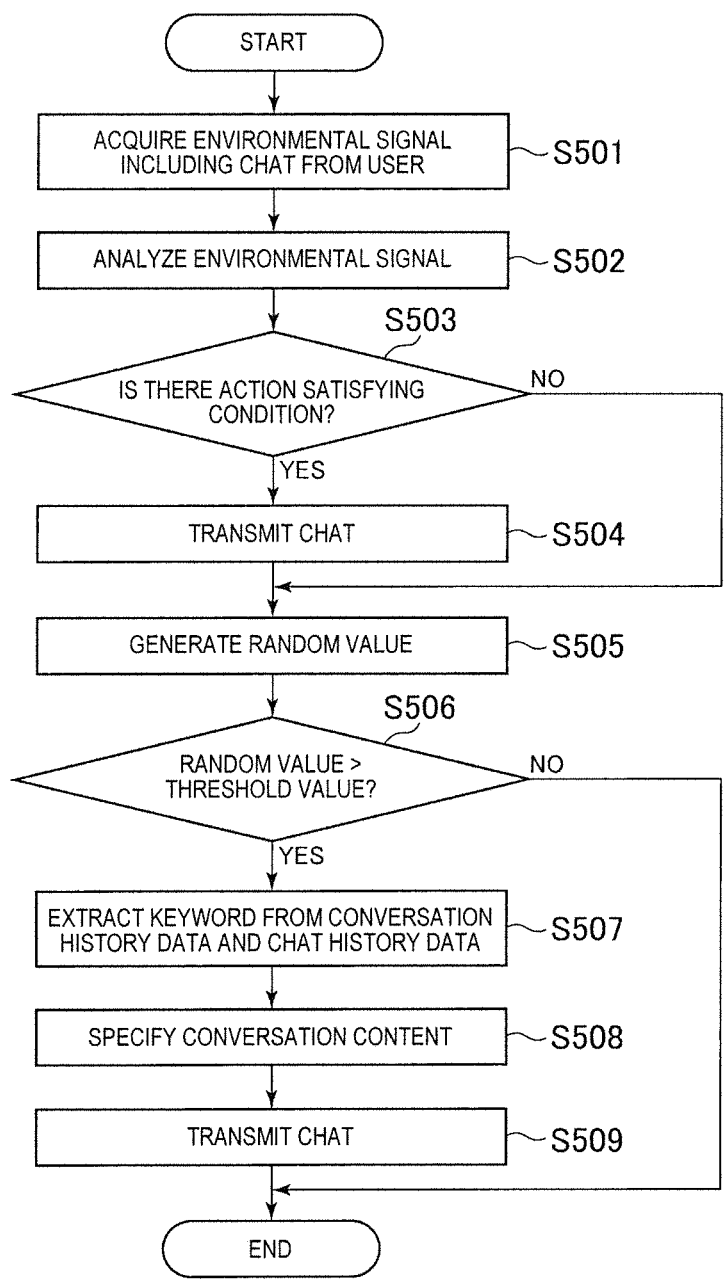
FIG. 21 is a flowchart illustrating a chat mode in the image display apparatus according to an example.

FIG. 21 is a flowchart illustrating the operation of the image display apparatus 1 in the chat mode and is a flowchart during an operation in the chat mode. When the chat mode is executed, the user executes a chat application for chatting with the image display apparatus 1 on the user's communication terminal. Then, a start signal of the chat application is transmitted from the user's communication terminal to the image display apparatus 1 via the network. Then, the control section 71 of the image display apparatus 1 activates the chat mode and starts a chat with the user's communication terminal via the chat server. The image display apparatus 1 may detect that the user is not near it by using a human sensor, activate the chat mode from the image display apparatus 1 under a predetermined condition, and transmit an activation signal of the chat application to the user's communication terminal to start the chat application. The chat server may be a dedicated server for the image display apparatus 1 or a general purpose chat server.

As illustrated in FIG. 21, first, the acquisition processing section 711 acquires various environmental signals (S501). These environmental signals may include the latest utterance input by the user in the chat. The various environmental signals acquired by the acquisition processing section 711 are delivered to the analysis section 712, and the analysis section 712 analyzes the delivered environmental signals (S502). The analysis section 712 performs syntax analysis on a string of utterance content in the user's chat and recognizes the utterance content. In addition, the analysis section 712 determines a situation from other environmental signals, for example, weather information and the like. The control section 71 determines whether or not the utterance in the chat to be executed by the character matches any of the defined conditions with reference to the analysis result, the sound data 752, the signal data 753, and the like (S503). Because although the sound data 752 is information to define a sound, it is common to a chat in the concept of a conversation, it can be used for the chat. As a result of the determination, if there is content to be uttered (S503: YES), the transmission processing section 715 transmits a message of specified message content to the communication terminal of the user via the chat application (S504). As a result of the analysis, if there is no character utterance to be executed (S504: NO), the control section 71 is shifted to the processing of step S505.

In step S505, the control section 71 generates, for example, a random value of 0 to 100 (S505). The random value is not limited to the range of 0 to 100. The control section 71 compares the generated random value with the threshold value for comparison with the generated random value. When the random value is larger than the threshold (S506: YES), the process proceeds to step S507. When the random value is equal to or smaller than the threshold (S506: NO), the process is terminated.

In step S507, the control section 71 reads the conversation history data 755 and the chat history data 756. The keyword is extracted from the conversation content information 903 of the read conversation history data 755 and the chat content information 1003 of the chat history data 756 (S507). This can be realized by, for example, syntax analysis or the like. Then, for example, a keyword with a highest appearance frequency among recent (for example, from the past day) keywords is selected. The selection of the keyword may be random or the keyword may be selected according to other criteria.

The control section 71 determines whether or not there is a conversation that matches the selected keyword and the environmental signal acquired in step S501 with reference to the random conversation data 757 (S508). Then, the transmission processing section 715 transmits a message indicating the content of the specified utterance to the communication terminal of the user via the chat application (S509). At this time, if there is a corresponding character image, the transmission processing section 715 transmits image data for displaying the image on the chat via the chat application, and the process is terminated. For example, if content of the conversation executed by the character is content related to "baseball," an image in which the character wears a baseball uniform is transmitted or an image in which the character has an item such as a ball or a bat is transmitted.

The process of FIG. 21 is repeatedly executed in the chat mode. In this manner, because the character produces utterances based on the conversation content interacted with the user in the past and the content of the executed chat in a random conversation in a chat, the user can feel the accumulation of a history with the character and feel closer to the character. The image display apparatus 1 can realize a configuration in which the content of the conversation and the content of the chat are linked to each other according to the process of FIG. 16 and the process of FIG. 21. As long as the content of the chat is reflected to the content of the subsequent conversation and the content of the conversation is also reflected to the content of the subsequent chat, the image display apparatus 1 can operate in accordance with an algorithm other than the algorithm described in the example to realize a similar configuration.

Figure 22A:
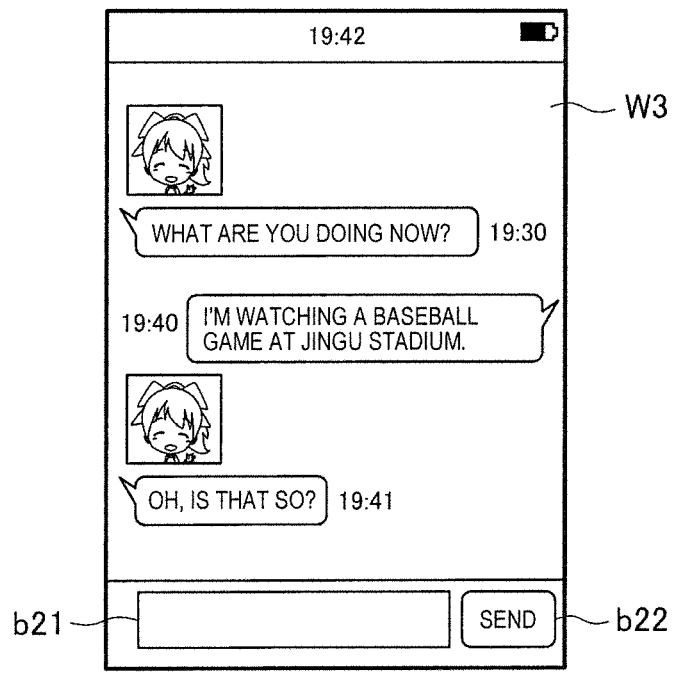
FIG. 22A is a diagram illustrating an example of a display screen of a communication terminal of a user of the chat mode according to the example.

According to the above-described configuration, for example, a chat as illustrated in FIG. 22A can be performed. FIG. 22A illustrates an ideographical example of a chat screen in the user's communication terminal. On a chat screen W3, utterance content between the user and the character is displayed. The user inputs a message to the input section b21 using the touch panel (not illustrated) of the communication terminal and touches the transmission section b22 to transmit the message.

Figure 22B:
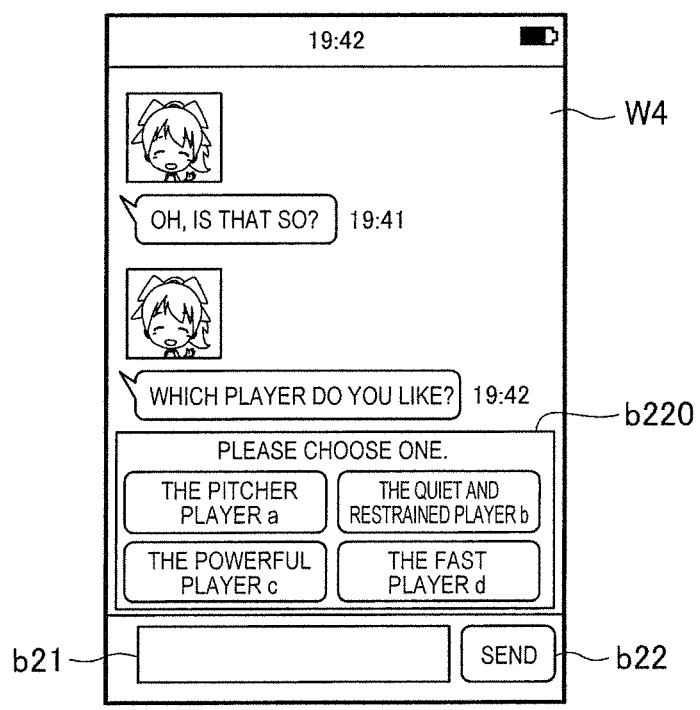
FIG. 22B is a diagram illustrating an example of a display screen of the communication terminal of the user of the chat mode according to an example.

In this chat, as shown in a chat screen W4 of FIG. 22B, unlike the normal chat, a question is cast from the character and an option b220 serving as a response to the question can be displayed. This can be realized by installing a dedicated chat application in the communication terminal of the user with the image display apparatus 1. Further, in this case, the chat server has a function of relaying a command from the image display apparatus 1 to realize this control to the communication terminal of the user. This command also includes a command of an answer selected by the user. By adopting such a configuration, it is also possible to give the user a feeling of playing a game with a character. Therefore, the user can enjoy a chat with a character with a game-like feel.

A conversation or chat using the conversation history data 755 and the chat history data 756 is executed at random in the example, but this is not limited and it goes without saying that the conversation or chat may be executed invariably when a predetermined condition is satisfied.

Operation Related to Sound

For example, when the user calls a name of a character into the microphone 704, the image display apparatus 1 can display an image of the character corresponding to the name. In addition, when the user talks to the displayed character about a specific topic, the image display apparatus 1 can output a response sound to the user.

Therefore, the user can call up a favorite character whenever he/she wants, and the character or the like can be displayed in the transparent case 2 in which the character or the like can be viewed more stereoscopically. In addition, when the user talks to the character or the like, the character or the like can act as if the character behaved according to the user's utterance. Thus, it is possible to give the user a feeling as if he/she were living with the character or the like in the same space.

In addition, turning on/off the lighting can be controlled in accordance with a sound input. For example, when the sound of "Turn off the lights" or "Good night" is input from the microphone 704, the control section 71 extracts remote control information relating to turning off the lighting stored in the storage device 75 in association with that string in advance from the storage device 75 and transmits corresponding infrared information from the infrared LED 703. Thereby, it is possible to turn off the indoor lighting. Likewise, the lighting can be turned on according to "Welcome home" or "Good morning." In addition, signals other than infrared information may be used here.

Further, it is also possible to perform a control operation combining such sound input and human detection by the human sensor 702. For example, when the sound "See you later" is input from the microphone 704 according to the user's utterance, the control section 71 is shifted to a monitoring mode corresponding to a string obtained by this sound. In addition, the mode can be shifted to the monitoring mode corresponding to "Take care" by the character or the like.

The monitoring mode is a mode in a state in which the user is not indoors. Thus, the monitoring mode can be canceled by inputting the sound "I'm home" according to the user's utterance and detecting a string obtained by this sound. In addition, it is also possible to cancel the monitoring mode in correspondence with "Welcome home" by the character or the like.

For example, when a person is detected by the human sensor 702 during the monitoring mode, the control section 71 can determine an abnormality and can provide a notification of the abnormality. Specifically, a predetermined warning sound or warning message can be output from the speaker 705, or a predetermined message can be transmitted to a destination registered in advance via the communication section 76. In addition, at this time, the control section 71 can cause the camera 722 to capture an image of an indoor space and store the image in the storage device 75, or transmit the image to the destination registered in advance via the communication section 76.

After a person is detected by the human sensor 702 during the monitoring mode, an abnormality may be immediately determined and the notification of the abnormality may be provided. If there is no cancellation of the monitoring mode within a certain period of time, there may be determined to be an abnormality and the notification of the abnormality may be made. Control operation related to infrared LED As a control operation using the infrared LED 703, the following operation can be performed. Specifically, when a wake-up time set in advance by a timer program arrives, the control section 71 controls the operation of a corresponding device on the basis of behavior information linked to the time information.

For example, when a timer program of "lighting on" at a wake-up time (7:00) and "lighting off" at a bedtime (23:00) is registered, the control section 71 extracts remote control information of "lighting on" from the storage device 75 to cause corresponding infrared information to be transmitted from the infrared LED 703 when 7:00 arrives and extracts remote control information of "lighting off" from the storage device 75 to cause corresponding infrared information to be transmitted from the infrared LED 703 when 23:00 arrives. In this manner, it is possible to automatically operate a predetermined device at a predetermined date and time.

In addition, on/off control of an air conditioner or the like can be performed according to temperature/humidity detected by the temperature/humidity sensor 611 and on/off control of the TV can be performed according to a time zone.
Control Operation Related to Sensor By using the light sensor 721, for example, if it is detected that the curtain is not opened despite the fact that it is daytime, it is possible to prompt the user to open the curtain.

Specifically, a sunrise time is stored as calendar information in the storage device 75. If illuminance input from the light sensor 721 does not reach predetermined illuminance even after that time, the control section 71 causes sound data ("Let's open the curtain") stored in advance in the storage device 75 to be output from the speaker 705.
Control Operation Related to Noise Sensor By using the noise sensor 613, for example, it is possible to draw the user's attention to the fact that the TV has been left on for a long time. Specifically, when the control section 71 determines that the TV has been turned on on the basis of a volume, a frequency, and the like of a sound input by the noise sensor 613, the control section 71 starts to measure a period of time from the time when the determination is made and causes sound data ("Let's turn off the TV") stored in advance in the storage device 75 to be extracted and output from the speaker 705 if the period of time of the state has exceeded a predetermined period of time. Thereby, it is possible to contribute to energy conservation and give the user a feeling as if he/she were being scolded by his/her wife.
Control Operation Related to Vibration Sensor It is possible to detect an earthquake and perform a notification operation using the vibration sensor 612.

For example, when vibration of a predetermined magnitude is detected by the vibration sensor 612 in a state in which no person is detected by the human sensor 702, it is determined that an earthquake has occurred and the control section 71 can cause a predetermined warning sound or warning message to be output from the speaker 705 or cause a predetermined message to be transmitted to a destination registered in advance via the communication section 76.

On the other hand, when vibration of a predetermined magnitude is detected by the vibration sensor 612 in a state in which a human being is detected by the human sensor 702, it is determined that the shaking is caused by an artificial action by the user or the like and notification is not provided. In this case, for example, a sound message ("Do not shake!") can be output from the speaker 705. In this manner, it is possible to perform an operation corresponding to each case while accurately distinguishing earthquakes and normal vibrations.
Control Operation Related to Temperature/Humidity Sensor Predetermined sound output control corresponding to the temperature/humidity sensor 611 can be performed. For example, when the temperature detected by the temperature/humidity sensor 611 is less than 10° C., the control section 71 can cause the speaker 705 to output a sound such as "It is cold today" at a predetermined timing.

If the humidity detected by the temperature/humidity sensor 611 is less than 40%, the speaker 705 can output a sound such as "The air is dry! Do not catch a cold" at a predetermined timing.

Operation Related to Image

It is possible to perform image display and sound output control corresponding to the image captured by the camera 722. For example, it is possible to change an image of the character by executing face tracking or expression detection using the image acquired by the camera 722.

Specifically, when the user moves, a character image in which the character sees the user may be displayed. In addition, a character image in which the character may occasionally turn his/her eyes and the character sees the user again may be displayed. Further, a character image in which the character smiles when the user smiles may be displayed. In addition, if the eyes meet after the user looks in a different direction from the character, a character image in which the character smiles when the eyes meet may be displayed. Further, if the user is drinking a beverage with a cup registered in the image display apparatus 1, a sound saying "I will also drink" may be output and a character image in which a beverage is drunk in the same cup may be displayed. Further, if the user is wearing clothes registered in the image display apparatus 1, a sound saying "You look good!" may be output.

Various input/output control is possible besides this.

For example, it is possible to output a sound such as "Please take an umbrella with you" on the basis of input information of temperature/humidity and weather information or it is possible to display featured clothes corresponding to temperature/humidity, weather information, calendar information, and the like for an input of a sound such as "What should I wear?" from the user.

Operation According to Likeability

A character displayed by the image display apparatus 1 may be made different in operation according to the character's likeability to the user. For example, as setting information of the character, character information such as preferences of a favorite word and color, a preferred action, an action which is glad to be done are set in advance and the character's likeability to the user is set. Then, a likeability value of the character is raised when the user performs a conversation, a chat, or an action that matches the preference of the character, and the character's likeability is lowered when the user performs a conversation, a chat, or an action that does not match the preference of the character.

Further, in the storage device 75, information defining the action of the character corresponding to the likeability value may be stored. For example, when the user is close to the character and the character says "You're too close," a sound with an angry tone may be output if the likeability is low and a sound with a vibrant tone may be output when the likeability is high. Therefore, the storage device 75 may store a plurality of sounds of speech of the same content according to likeability. Thereby, it is possible to cause the character of the image display apparatus 1 to be human-like and allow the user to feel more familiar with the character.

Further, the image display apparatus 1 may realize the following process.

Wake-Up Determination System

For example, the control section 71 can make a wake-up call using calendar information including a wake-up time of the user registered in the storage device 75 at the calendar site and a time acquired by the data management section 716. Thereafter, for example, when the user gets out of bed and his/her face detected by the analysis section 712 reaches a certain size or more, the control section 71 determines that the user has woken up and the user executes a process after waking up. For example, the user may transmit schedule information of his/her own communication terminal to the image display apparatus 1 and the image display apparatus 1 may operate according to content indicated in the received schedule information. For example, when the schedule information indicates "wake-up at 6 o'clock on the $23^{rd}$," the control section 71 may cause the character to wake up the user at 6 o'clock on the $23^{rd}$.

Outing Determination System

For example, when the position information of the communication terminal of the user acquired by the acquisition processing section 711 is outside the home in addition to the user's sound "See you later," detected by the analysis section 712, the control section 71 can determines that the user has gone out. In addition, for example, in addition to the fact that the presence of the user is not detected by the human sensor 702, when the position information of the user's communication terminal acquired by the acquisition processing section 711 is outside the home, it can be determined that the user has gone out.

Home Return Determination System

For example, when the presence of the user has been detected by the human sensor 702 after it is determined that the user has gone out in the outing determination described above, the control section 71 can determine that the user has returned home. In this detection, in addition to detecting a person with the human sensor 702, the user's face may be determined from an image captured by the camera 722.

Falling-Asleep Determination System

While the user is at home, the control section 71 can determine that the user has dozed off, for example, if the analysis section 712 analyzes that the movement of the user is not detected for one hour by the human sensor 702 and illuminance detected by the light sensor 721 is bright to an extent that the light is not turned off. As used herein, "dozing off" means that the user falls asleep without turning off the light during some task such as watching television or playing a game. The image display apparatus 1 may control the light so that the lighting of the room is turned off when it is determined that the user has dozed off and the lighting of the room is not turned off.

Wake-Up Time Confirmation System

For example, the control section 71 can suggest so that the next morning alarm clock time is earlier to secure a usual morning preparation time, for example, if the outing time of the next morning is earlier than that of a usual morning. Specifically, when a time difference between a wake-up time of the next day and a scheduled outing time of the next day is shorter than the outing preparation time obtained by the time difference between the average wake-up time and outing time, the control section 71 suggests that the wake-up time of the next morning be earlier. For example, the control section 71 selects and outputs a sound of "You have to leave early tomorrow. Should I make your wake-up time earlier?" In addition, when there is a "YES" response from the user, the control section 71 changes the wake-up time registered in the storage device 75.

In addition, for example, the control section 71 can suggest that the wake-up time of the next morning be earlier if the user is late one morning. Specifically, when the outing time of that morning is delayed by a predetermined time (for example, 10 minutes) from the scheduled outing time, the control section 71 can suggest to advance the wake-up time by the predetermined time. For example, the control section 71 selects and outputs the sound of "You are late today! Would you like to wake up ten minutes earlier tomorrow?" from the sound data 752. In addition, when there is a "YES" response from the user, the control section 71 changes the wake-up time registered in the storage device 75.

Squat Determination Function

For example, a system in which the analysis section 712 detects vertical motion of face recognition and counts the number of times of squatting can be provided in the control section 71. In addition, the control section 71 can also apply the system to a system to count the number of abdominal exercises and the number of push-up landings. Thereby, the display processing section 713 can display a character image or a performance image to cheer for the action of the user. In addition, the sound output section 714 can output a sound in which the character counts the number or cheers for the action of the user.

Selfie Camera System

For example, the control section 71 may allow the user to capture a selfie with the character. At this time, when the user moves to a range in which shooting by the camera 722 is possible and an image of the user is captured by the camera 722, the control section 71 combines the captured image with the character image. In addition, the control section 71 may upload the captured image combined with the character image to a providing server such as a social networking service (SNS) or the like via the Internet or the like.

Coffee Break Time System

The control section 71 may allow a character to suggest a coffee break to the user. For example, when a time managed by the data management section 716 is a predetermined time, the transmission processing section 715 transmits an operation signal to a coffee maker. In addition, the display processing section 713 selects and displays an image in which the user is prompted to have the coffee break, and the sound output section 714 selects and outputs a sound for prompting the user to have the coffee break. Further, when the analysis section 712 detects that the user finishes drinking coffee from an image or sound, the control section 71 ends the coffee break. For example, the control section 71 can end when the analysis section 712 detects a sound of "That was delicious" or "Thank you for the coffee."

Call/Response System

The control section 71 may allow the character to call names each other. The sound output section 713 outputs the character's sound calling the name or nickname registered in the user data 754. In addition, when a sound of the name or nickname of the character uttered by the user is detected by the analysis section 712, the sound output section 713 can output the character's sound calling the user's name or nickname.

Clothing Change Recommendation System

The control section 71 may recommend a coordinated outfit for the user. For example, the analysis section 712 determines a shape or color of what the user wears such as a "square hat over the face," a "long rectangular tie under the face" or the like from an image captured by the camera 722. In addition, the control section 71 may recommend a recommended color by comprehensively determining the user's expression or mood analyzed from the environmental information acquired by the acquisition processing section 711, the user's schedule registered in the storage device 75, the weather information, the season and the like.

Operation Request

The control section 71 can receive a device operation request or a schedule management request from the user via an information processing device such as a communication terminal. For example, when a device operation is requested, the transmission processing section 715 outputs an operation signal according to a requested signal. In addition, when a schedule registration or change is requested, the data management section 716 registers or updates data according to this signal. Specifically, as described above with reference to FIG. 13B, it is possible to operate the control section 71 by using a chat function or using a memo or a message board or the like. Because the user can feel as if he/she were asking the character to do what he/she wants, the user can feel as if he/she were asking a human being.

Storm Off to Bed Mode

When a predetermined condition is satisfied, the control section 71 may cause a character image in which a character gets upset and stays in bed sulking to be displayed. For example, when the image display apparatus 1 is not connected to an external network, or when the image display apparatus 1 is not connected to the user's communication terminal via a network, an image in which the character gets upset and stays in bed sulking is selected and displayed. Thereby, since a character image which makes an appeal to the user is displayed, the image display apparatus 1 can make the expression more humanlike and more realistic.

Interest Transition Algorithm

When interests or hobby preferences of a plurality of types are registered in the user data 754, the control section 71 can randomly select one of the plurality of types and reflect it in an image or sound to be output. For example, at this time, in the user data 754, each weight value is set for the user's preference information and the control section 71 can select an image or sound to be output in consideration of the weight value. In addition, the weight value of these hobby preferences can be increased or attenuated with the passage of time. Furthermore, when the weight value is equal to or less than a predetermined value, a topic of another hobby preference may be selected by increasing a weight value of another preference.

Algorithm of Life Mode

In the life mode, the control section 71 can select an image to be displayed and or a sound to be output on the basis of the "user's preference information" or the "character's internal preference information." For example, if the user likes a comic, the control section 71 can display a character image in which the character is reading the comic in the life mode and can output a sound corresponding thereto. In addition, if the user likes cooking, the control section 71 can display a character image in which the character is cooking food during free time and can output a sound corresponding thereto.

Interesting Talk

The control section 71 can output an image and sound related to interaction for a certain period of time after the interaction with the user occurs. The control section 71 realizes relevant control by storing a time at which the interaction with the user occurred and determining whether or not a predetermined period of time has elapsed from the time.

User Behavior Analysis Estimation System

Data used to determine the user's behavior in the control section 71 may be guided by referencing a plurality of patterns of data given as teacher data in advance. Specifically, by using various sensors provided in the image display apparatus 1, sensing data obtained when the user performs a predetermined action is acquired, stored in association with information indicating the predetermined action at that time, and used as the teacher data. The image display apparatus 1 can analyze and estimate the user's behavior by comparing data input from various sensors provided therein with the teacher data. As a result, the control section 71 can cause the character to perform an action according to the user's behavior. In addition, the control section 71 may sequentially update the teacher data according to the user's behavior.

Human Emotion Tracking System

Further, the image display apparatus 1 may estimate the user's emotion and cause the character to perform an action corresponding to the user's emotion. Specifically, the process is executed as follows.

The control section 71 may perform a facial expression recognition process from the user's face image captured by the camera 722 to estimate the user's emotion. This is done by information of feature quantities of face images according to various emotions is stored in advance in the storage device 75, a face image estimated to be most similar is specified by pattern matching with the captured image, and the corresponding emotion is specified. In addition, the user's emotion may be estimated from a voiceprint input from the microphone 704. As the face image, information of sound (for example, information of frequencies and volumes) corresponding to various emotions is stored in advance in the storage device 75, and the user's emotion is estimated in accordance with feature quantities with the input voiceprint. Alternatively, the control section 71 may estimate the user's emotion from content of the conversation or chat with the user. For example, the user's emotion is estimated from words expressing emotions such as "That was fun" or "That's horrible" during a conversation.

Then, the control section 71 of the image display apparatus 1 can make the character action such as agreeing with the user or encouraging the user in accordance with individuality of the character stored and set in the image display apparatus 1. For example, if it is estimated that the user feels lonely as a result of determining the user's emotion, a speech sound saying "I bet you were lonely. Don't you know that I am here?" or "That's no reason to feel lonely! It will be all right!" may be output from the sound output section 714. In addition, for example, if it is estimated that the user is depressed, he/she may be encouraged by saying "Hang in there!" Needless to say, the character's behavior is an example.

Thank-You Learning System

The control section 71 of the image display apparatus 1 stores content in which words of gratitude such as "thank you" conveyed in a conversation or a chat from the user are conveyed. Then, a condition at that time is stored. That is, the control section 71 (character) stores "when" the user says "thank you" and "what" the user says "thank you" for. That is, "timing" and "action of character" at the time of gratitude from the user are associated with each other and stored in the storage device 75. Then, the control section 71 may cause the character to reproduce the action of gratitude at the "when" timing.

Face Learning System

When the control section 71 of the image display apparatus 1 determines that a face image of a person different from the user is included in the image captured by the camera 722, the control section 71 may attach the face image to the chat and ask "Who is this?" To the question, by the user answers "That's my mom," the image display apparatus 1 associates and stores the face image obtained by capturing the person and the term "my mom." In addition, the control section 71 of the image display apparatus 1 may return, for example, a message such as "Oh, it's your mom. I will remember your mom" to the user's answer "That's my mom." In addition, when the face image of the stored person is captured at another timing, the image display apparatus 1 may transmit a message "Your mom is here" to the user's communication terminal. In addition, when the behavior of the person can be estimated at that time, the message including content of the estimated behavior may be transmitted. In addition, this configuration can also be used for crime prevention when the face image captured by the image display apparatus 1 is the face of a person unknown to the user.

System for Anxiety

When a return time is delayed by a certain time or more (for example, when the current time is later than 22:00 PM) after it is detected that the user has gone out (when a predetermined period of time has elapsed in a state in which the human sensor 702 does not detect a person), the image display apparatus 1 may contact the user by Twitter (registered trademark), e-mail, a chat, a phone or the like. For example, the control section 71 may transmit a message such as "You're late. Are you OK?" or may make a phone call. When the phone call is made, it is necessary to set up the image display apparatus 1 for connection to a phone line. In addition, a threshold value for whether or not to take such an action may be determined and whether or not to take an action of worrying about the user may be decided according to whether or not the random value exceeds the threshold value. Further, the image display apparatus 1 may be controlled so that the threshold value is larger when the time is later. In addition, this threshold value may be changed according to the state of the user in the morning of that day. For example, when it is estimated that a physical condition of the user is bad, the threshold value may be controlled to be smaller than usual.

Infrared Information Monitoring System

The image display apparatus 1 may further include an infrared sensor to acquire infrared information of surroundings and cause the character to take an action corresponding to the acquired infrared information. For example, by detecting that the user operates a remote controller of a TV by acquiring the infrared information output from the remote controller, a time, a day of the week, and a channel to which the TV tuned may be stored. Then, when the same time on the same day of the week as another day arrives, the image display apparatus 1 may control the TV to tune into the same channel.

In addition, when it is detected that the temperature is high while the temperature of the user's body and the temperature of the room are monitored from the infrared sensor, the control section 71 of the image display apparatus 1 may instruct the character to have a conversation for the suggestion with the user such as "Why don't you open a window?" "Should I turn on the fan?" or "Should I turn on the air conditioning?"

Viewing Program Monitoring System

The image display apparatus 1 may have a configuration for acquiring and storing information on a TV or radio program currently being viewed by the user. Specifically, TV program information is acquired from a network, sound popularity processing on a sound emitted from the TV is performed, and the program currently being viewed by the user is estimated. Alternatively, the image display apparatus 1 is connected to various home appliances, acquires ON/OFF information and channel information of the TV, and identifies, specifies and stores programs viewed by the user. Then, a keyword may be acquired from a program table related to the stored program, and may be set as a topic of conversation.

For example, in a cloud server, sound recognition is performed with regard to what type of conversation is being performed with respect to the program of each broadcasting station, content of the program of each broadcasting station is converted into text, and cloud text information is acquired. Meanwhile, in the image display apparatus 1, sound information of a program that the user is viewing is acquired from the microphone 704. Then, sound recognition is applied to the acquired sound and the acquired sound is converted into user text information. By comparing and collating the cloud text information and the user text information, the image display apparatus 1 can specify which program the user is viewing. Then, the control section 71 may specify the program that the user is viewing and incorporate the program name, make a recommendation, for example, "A TV is good in the morning!" and control the remote controller of the TV.

Mood Reading System

The control section 71 of the image display apparatus 1 may determine whether or not the user is busy and take an action corresponding to the determined state, i.e., a so-called mood reading action. The busyness of the user is determined according to various environmental signals acquired by the control section 71 (acquisition processing section 711) of the image display apparatus 1. For example, when the user's wake-up time was late and a position of the user detected by the human sensor 702 is detected to move to the left or right a predetermined number of times or more (for example, 10 times or more) within a predetermined period of time (for example, within 5 minutes), the control section 71 of the image display apparatus 1 determines that the user is busy and controls the character so that the character does not talk to the user. In addition, when the user does not move much, i.e., when the user position detected by the human sensor 702 remains within the predetermined range, the control section 71 performs control so that the character talks to the user. In this manner, the control section 71 of the image display apparatus 1 can determine whether or not to cause the character to take an action by looking at the state of the user, i.e., reading his/her mood.

Face & Eye Tracking System

The control section 71 of the image display apparatus 1 may detect a line of sight of the user on the basis of a face image and an eye image of the user acquired by the camera 722. For example, it is detected that the face image of the user faces the direction of the image display apparatus 1 and it is detected whether or not the pupils of the eyes are facing the image display apparatus 1. Then, when the user's line of sight is directed toward the character, the control section 71 can make the character act shy or lock eyes with the user.

Virtual Wind System

The control section 71 of the image display apparatus 1 may detect that the user is breathing on the microphone 704 to generate an effect of blowing the wind in the world inside the image display apparatus 1. For example, performance of the character's clothes shaking may be represented. This configuration can be realized by providing a wind pressure sensor in the image display apparatus 1 instead of the microphone 704.

Physical Condition Management System

The image display apparatus 1 may acquire the user's state information from a device capable of detecting a state of the user such as a weight scale or an exercise meter held by the user, via the communication section 76. For example, the control section 71 causes the character to ask "Are you eating properly?" when the weight of the user detected from the weight scale has decreased by a predetermined amount or more within a predetermined period and causes the character to recommend "You should do some exercise!" when the weight is a predetermined amount or more above an average weight with respect to the user's height. In addition, when the user repeatedly exercises, the control section 71 may cause the character to output a sound in which the number of repetitive exercises is counted while referring to the image captured by the camera 722. For example, counting the number of push-ups, squats, or the like can be considered.

Real-Time Motion Distribution System

The control section 71 of the image display apparatus 1 may perform a special operation by receiving a special signal via the communication section 76. Specifically, a motion capture sensor is attached to a body of a person for a development management side, and movement of the person is distributed to image display apparatuses 1 of all users. The image display apparatus 1 can also realize program distribution by displaying a character having the same motion as the distributed motion. For example, when an earthquake prompt or the like has been received as a special signal, the sound output section 714 may output a sound such as "There has been an earthquake of seismic intensity 4 in ○○. Please remain calm." In addition, when image data to be displayed is included in the special signal, the image data may be displayed. As this image data, for example, image data of a real person may be provided, for example, an interview with a famous person may be displayed and his/her sound may be output. Thereby, for example, it is possible to realize program distribution by hologram. In addition, the image display apparatus 1 can acquire image data of a real person and acquire sound data of the person so that it can be displayed as a character for displaying the real person.

Hologram Avatar Phone System

When a phone set is connected to the image display apparatus 1 or the image display apparatus 1 is provided with a phone function, the image display apparatus 1 may have the following functions. At this time, the image display apparatus 1 may include a configuration in which a facial expression of the user is specified on the basis of an image acquired from the camera 722, avatar information having the same expression as the specified facial expression is generated, the avatar information is transmitted to a phone communication partner, and an avatar image is displayed on a display screen of the phone communication partner.

Reporting System

The control section 71 of the image display apparatus 1 may detect that the user has returned home and cause the character to report the character's day to the user. For example, when the human sensor 702 newly detects the user in a state in which the human sensor 702 has not detected the user for a predetermined period of time or more, the analysis section 712 determines that the user has returned home. Then, the control section 71 may cause the character to report an event occurring in the surroundings (content in which occurrence of the event is estimated on the basis of information capable of being acquired from various sensors) to the user. For example, the character may report "It was hot today" when the temperature/humidity sensor 611 has detected a predetermined temperature or more for a predetermined period of time or more, the character may report "It was hot and humid today" when the temperature/humidity sensor 611 has detected a predetermined temperature and humidity or more for a predetermined period of time or more, and the character may report "There was an earthquake today. Are you safe?" when an earthquake prompt message has been received, and the character may report "Someone was here while you were out."

Contact Phone System for Poor Physical Condition

When a phone function is installed in the image display apparatus 1, if the user's physical condition is bad, the control section 71 of the image display apparatus 1 causes phone communication indicating "He/she will take a day off due to his/her poor physical condition today" to be performed instead of the user using a preset phone number of the user's workplace, a study place or the like in accordance with an instruction from the user.

Gesture Control System with Specific Device

The control section 71 of the image display apparatus 1 may control the character according to a signal from a specific item attached to or held by the user. For example, when the specific item is a ring, and it is detected that the user is rubbing the ring by the image analysis, the character may be made to perform a shy action. Alternatively, when the user is holding a pen light as the specific item and swinging it left and right, the control section 71 may display an image in which the character has the pen light and project a video in which its hand swings left and right.

Character Clothing Change System

The control section 71 of the image display apparatus 1 may appropriately change clothing or an item to be worn by the character. Therefore, the control section 71 stores display data of various clothes and items in the storage device 75 or downloads and acquires the display data from an external server. Then, the control section 71 may display a character wearing clothing according to the season, weather, temperature, or time zone including a date and time from a time measurement section (not illustrated) (a clock for detecting a current date and time) mounted on the image display apparatus 1.

Instantaneous Movement System

When the user holds a plurality of image display apparatuses 1 according to the above-described example, the image display apparatuses 1 may be linked so that the character is displayed only at positions that can be confirmed by the user among them. In that case, the control section 701 may represent performance in which the character has also moved to the image display apparatus 1 at a movement destination to which the user has moved.

Cleaning System

The control section 71 of the image display apparatus 1 may communicate with a robot cleaner as a home appliance and control the robot cleaner to clean a room of the user. In addition, at that time, the control section 71 may specify a place to be normally cleaned and a place which is not cleaned for the user.

Tooth-Brushing Support System

The control section 71 of the image display apparatus 1 may cause the character to take actions to support the user's tooth-brushing by detecting that the user is brushing his/her teeth by image analysis or may cause the character to support the action of taking the medicine or applying the medicine to the affected part by detecting that the user takes medicine or applies medicine to an affected part.

Athlete Motion Capture System

The image display apparatus 1 may acquire a video such as a sports broadcast and project an image in which the character executes the same motion as the motion of an athlete appearing in the sports broadcast. In addition, at that time, the user indicates a direction of the character using the communication terminal of the user, an operation panel provided in the image display apparatus 1, a sound or the like, and the image display apparatus 1 may display a video according to the indication. In addition, at this time, an image of the athlete himself/herself may be displayed instead of the character.

Live Cheering System

In the image display apparatus 1, when the user is viewing a concert of an idol or the like, the control section 71 displays an image in which the character is also viewing the concert video and causes the character to make a cry or wave a chemical light as if the character were participating in the concert. Alternatively, when the control section 71 causes the character to sing a song and dances like an idol as a virtual singer, the control section 71 may cause the character's operation to be linked in accordance with clapping or cheering from the user. For example, by detecting the timing of the clapping of the user, an image in which the character follows the step in accordance with the timing may be displayed. The character's action may change according to a sound volume of cheering from the user.

Multi-Agent System

In the image display apparatus 1, information on a plurality of characters may be stored in the storage device 75. Then, the control section 71 may select and project the character to be used in accordance with a situation of the user. In addition, when multiple cores are mounted on the image display apparatus 1 and one character is controlled by one core, the image display apparatus 1 may simultaneously project a plurality of characters.

Aging System

The image display apparatus 1 may display an image so that the character grow older at a certain time when the character is displayed. For example, the image display apparatus 1 may display a state of a baby when the character is summoned for the first time and may display that the character is growing by changing the image of the character every time a predetermined period of time has elapsed from the state (for example, every time one month has elapsed).

System that Supports Various Languages

The image display apparatus 1 can support various languages through installation of a sound recognition algorithm or a dialog system in accordance with a language of each country.

Original Character System

A character displayed by the image display apparatus 1 may be created by the user as an original. The image display apparatus 1 may be configured so that various formats of data required therefor is prepared and the user is able to perform editing them. Edited data generated by the user's PC or the like may be transmitted to the image display apparatus 1. In addition, character data created by the user may be distributed via a network.

Various Character Summoning Systems

As a character displayed by the image display apparatus 1, data of a character of virtual reality (VR) content may be used. For example, a character of a game or the like played by the user using a head mounted display (HMD) may be used as a character displayed by the image display apparatus 1. In addition, by downloading the characters of various games (for example, smartphone games and the like) as well as the VR content, the downloaded characters can be used as displayed characters.

External Implementation of Chat Function

Although the image display apparatus 1 has a chat function in the above description, the chat function may be executed by an external device. That is, when the user exchanges a message with the character of the image display apparatus 1 using the communication terminal, a configuration for exchanging it with the external server may actually be adopted. In that case, it is necessary for the external server to hold a response algorithm serving as a character and acquire the conversation history data 755 and the chat history data 756 related to the user in advance from the image display apparatus 1. Thus, when there is a chat input from the user, the external device may have a configuration for accessing the image display apparatus 1 to acquire such information. After the external device completes the chat with the user's communication terminal, the external device may transmit the chat history data 756 to the image display apparatus 1, and the image display apparatus 1 may overwrite the received chat history data 756 on the storage device 75. With such implementation, it is possible to realize a system comprising a device having a chat function provided outside the image display apparatus 1.

As described above, according to the image display apparatus 1 related to the first example, a character or the like which is a display target can be displayed like a real object in the same space. In addition, the image display apparatus 1 causes the character or the like to behavior corresponding to environmental information such as the user's sound. Further, in the image display apparatus 1, it is possible to display a performance image expressing emotions and the like of the character together with a character image. Further, because content of the past with respect to the content of the conversation or chat executed with the user is reflected in the latest conversation or chat, the user feels more familiar with and more of an affinity toward the character.

Thereby, it is possible to give the user a sensation as if he/she were in the same space as a real character or the like. In addition, the user can feel more familiar with the character.

When each process is realized by the control section 71 of the image display apparatus 1 executing the image display program, the conversation program, the chat program or the like has been described in the above-described example. On the other hand, in the image display apparatus 1, instead of the CPU, each process may be implemented by a logic circuit (hardware) or a dedicated circuit formed in an integrated circuit (an integrated circuit (IC) chip or large scale integration (LSI)), a field programmable gate array (FPGA), a complex programmable logic device (CPLD), or the like. In addition, these circuits may be realized by one or more integrated circuits, and the functions of the plurality of functional sections described in the above-described example may be realized by one integrated circuit. The LSI may be referred to as VLSI, super LSI, ultra LSI or the like according to the degree of integration.

Figure 23:
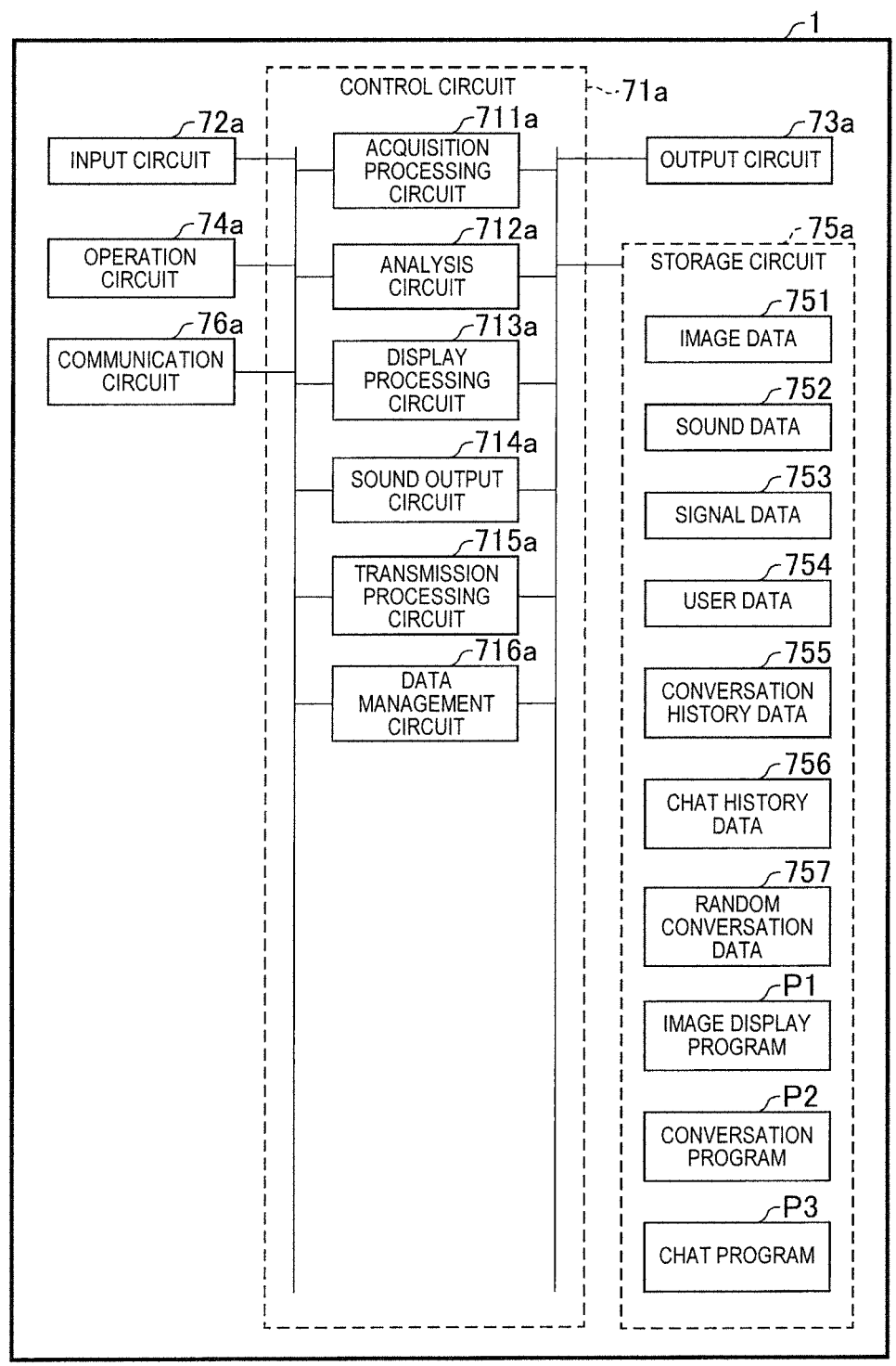
FIG. 23 is a circuit configuration diagram of the image display apparatus according to the example.

In other words, as illustrated in FIG. 23, the image display apparatus 1 may include a control circuit 71*a*, an input circuit 72*a*, an output circuit 73*a*, an operation circuit 74*a*, a memory circuit 75*a*, and a communication circuit 76*a*. An acquisition control circuit 711*a*, an analysis circuit 712*a*, a display processing circuit 713*a*, a sound output circuit 714*a*, a transmission processing circuit 715*a*, and a data management circuit 716*a* of the control circuit 71*a* are controlled by the image display program P1, the conversation program P2, the chat program P3 and the like. Their functions are similar to those of parts having similar names shown in the above-described example.

As the above-described storage device 75, a "non-transitory tangible medium" such as a tape, a disk, a card, a semiconductor memory, a programmable logic circuit or the like can be used. In addition, the image display program P1, the conversation program P2, and the chat program P3 may be supplied to the above-described processor via any transmission medium (a communication network, broadcast waves, or the like) capable of transmitting the above-described image display program P1, conversation program P2, chat program P3. The program can also be realized in the form of a data signal embedded in carrier waves, in which the above-described broadcast display program is embodied by electronic transmission. Besides these programs, sound data and image data related to characters may also be downloaded from a server storing them and used in the image display apparatus 1. Thereby, it is possible to enjoy various characters on the image display apparatus 1. In addition, it is possible to download and use new sound data or image data of the same character. In addition, various data stored in the storage device 75 may be stored not in the storage device 75 but in an external device such as a server on a network capable of being accessed by the image display apparatus 1. Then, the control section 71 of the image display apparatus 1 may access the external server at necessary timing every time via the communication section 76 to acquire necessary information. For example, information on a language model, a sound model, or the like in the above-described example can be stored in the network.

The above-described image display program P1, conversation program P2, and chat program P # can be implemented using a script language such as ActionScript, JavaScript (registered trademark), Python, or Ruby, a compiler language such as a C language, C++, C #, Objective-C, or Java (registered trademark), an assembly language, a register transfer language (RTL) and the like.

The program can be suitably used in an image display apparatus capable of displaying a character image and mutually linking content of a conversation to be performed with a user and a chat to be exchanged with a communication terminal of the user.

The invention claimed is:

1. A display device comprising:
   a display configured to display a character or a person;
   a memory configured to store computer-readable instructions; and
   one or more processors configured to execute the instructions to,
   control the display to display (i) an image related to a cloth of the character or the person or (ii) an image related to an item which the character or the person is capable of wearing,
   acquire a first voice from a user,
   output a first sound from the character or the person displayed in the display based on the first voice from the user,
   send a first content to a communication terminal of the user,
   receive a second content from the communication terminal,
   output a second sound from the character or the person displayed in the display on the basis of (i) at least the first sound or the first voice and (ii) at least the first content or the second content, and
   send a third content to the communication terminal of the user on the basis of (i) at least the first sound or the first voice and (ii) at least the first content or the second content,
   wherein the display is controlled to display (i) the image related to the cloth of the character or the person or (ii) the image related to the item which the character or the person is capable of wearing on the basis of (i) at least the first sound or first voice and (ii) at least the first content or the second content.

2. The display device according to claim 1, wherein the display displays the character or the person which is changed in a display mode on the basis of (i) at least the first sound or the first voice and (ii) at least the first content or the second content.

3. The display device according to claim 2, wherein the display mode includes at least one of (i) a changing motion of the character or the person (ii) a changing a cloth of the character or the person, or (iii) displaying the character or the person and a desired item.

4. The display device according to claim 1, further comprising a detector that detects a periphery of the display device, wherein the one or more processors are configured to execute the instruction to send the first content or a third content to the communication terminal.

5. The display device according to claim 1, wherein the first content or the third content is displayed on the communication terminal together with an image of the character or the person.

6. The display device according to claim 1, wherein the one or more processors are configured to execute the instructions to output the second sound based on an emotion of the user on the basis of (i) at least the first sound or the first voice and (ii) at least the first content or the second content.

7. The display device according to claim 1, wherein the one or more processors are configured to execute the instruction to acquire a signal of environment including at least one of (i) a position of the user, (ii) a motion of the user, or (iii) information of outside of the display device and output the second sound based on the acquired signal of environment.

8. The display device according to claim 1, further comprising;
a case that is configured a light transmitting member at least in part; and
a screen that is installed in the case, the screen having translucency at least in part,
wherein the display projects the character or the person to the screen.

9. The display device according to claim 1, further comprising a speaker that outputs the first sound and the second sound based on controlling by the one or more processors.

10. The display device according to claim 1, wherein the one or more processors are configured to execute instruction to send the first content and the third content to the communication terminal via a server.

11. An information processing method by an image display device, the method comprising:
displaying, by one or more processors of the image display device, a character or a person;
controlling, by the one or more processors, the image display device to display (i) an image related to a cloth of the character or the person or (ii) an image related to an item which the character or the person is capable of wearing,
acquiring, by the one or more processors, a first voice from a user,
outputting, by the one or more processors, a first sound from the character or the person displayed in the image display device based on the first voice from the user,
sending, by the one or more processors, a first content to a communication terminal of the user,
receiving, by the one or more processors, a second content from the communication terminal,
outputting, by one or more processors of the display device, a second sound from the character or the person displayed in the display on the basis of (i) at least the first sound or the first voice and (ii) at least the first content or the second content,
sending, by the one or more processors, a third content to the communication terminal of the user on the basis of (i) at least the first sound or the first voice and (ii) at least the first content or the second content,
wherein the controlling of the image display device to display (i) the image related to the cloth of the character or the person or (ii) the image related to the item which the character or the person is capable of wearing is on the basis of (i) at least the first sound or first voice and (ii) at least the first content or the second content.

12. A non-transitory computer-readable recording medium having a program stored therein that, when executed by one or more processors, causes the at least one or more processors to perform operations for an image display device, the operations including:
displaying, by one or more processors of the image display device, a character or a person;
controlling, by the one or more processors, the image display device to display (i) an image related to a cloth of the character or the person or (ii) an image related to an item which the character or the person is capable of wearing,
acquiring, by the one or more processors, a first voice from a user,
outputting, by the one or more processors, a first sound from the character or the person displayed in the display based on the first voice from the user,
sending, by the one or more processors, a first content to a communication terminal of the user,
receiving, by the one or more processors, a second content from the communication terminal,
outputting, by the one or more processors, a second sound from the character or the person displayed in the display on the basis of (i) at least the first sound or the first voice and (ii) at least the first content or the second content, and
sending, by the one or more processors, a third content to the communication terminal of the user on the basis of (i) at least the first sound or the first voice and (ii) at least the first content or the second content,
wherein the controlling of the image display device to display (i) the image related to the cloth of the character or the person or (ii) the image related to the item which the character or the person is capable of wearing is on the basis of (i) at least the first sound or first voice and (ii) at least the first content or the second content.

* * * * *